(12) United States Patent
Dejong et al.

(10) Patent No.: US 7,932,006 B2
(45) Date of Patent: Apr. 26, 2011

(54) PHOTOCONDUCTORS

(75) Inventors: Kathy L. Dejong, Mississauga (CA); Nan-Xing Hu, Oakville (CA); Hany Aziz, Oakville (CA); Jennifer A. Coggan, Cambridge (CA); Johann Junginger, Toronto (CA); Ah-Mee Hor, Mississauga (CA); John F. Yanus, Webster, NY (US); Kenny-Tuan Dinh, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 999 days.

(21) Appl. No.: 11/809,126

(22) Filed: May 31, 2007

(65) Prior Publication Data

US 2008/0299472 A1  Dec. 4, 2008

(51) Int. Cl.
*G03G 5/00* (2006.01)
(52) U.S. Cl. ......................................................... 430/66
(58) Field of Classification Search .................. 430/66
See application file for complete search history.

(56) References Cited

U.S. PATENT DOCUMENTS

| | | | |
|---|---|---|---|
| 4,265,990 A | 5/1981 | Stolka et al. | |
| 4,555,463 A | 11/1985 | Hor et al. | |
| 4,587,189 A | 5/1986 | Hor et al. | |
| 4,921,773 A | 5/1990 | Melnyk et al. | |
| 5,473,064 A | 12/1995 | Mayo et al. | |
| 5,482,811 A | 1/1996 | Keoshkerian et al. | |
| 5,521,306 A | 5/1996 | Burt et al. | |
| 6,913,863 B2 | 7/2005 | Wu et al. | |
| 7,037,631 B2 | 5/2006 | Wu et al. | |
| 7,592,110 B2 * | 9/2009 | Dinh et al. | 430/58.2 |
| 7,785,757 B2 * | 8/2010 | Yanus et al. | 430/58.75 |
| 2006/0105264 A1 | 5/2006 | Dinh et al. | |

FOREIGN PATENT DOCUMENTS

| | | |
|---|---|---|
| EP | 1808732 A1 | 7/2007 |
| WO | WO 0022055 | 4/2000 |

OTHER PUBLICATIONS

John F. Yanus et al., U.S. Appl. No. 11/593,875 on Silanol Containing Overcoated Photoconductors, filed Nov. 7, 2006.
John F. Yanus et al., U.S. Appl. No. 11/593,657 on Overcoated Photoconductors with Thiophosphate Containing Charge Transport Layers, filed Nov. 7, 2006.
John F. Yanus et al., U.S. Appl. No. 11/593,656 on Silanol Containing Charge Transport Overcoated Photoconductors, filed Nov. 7, 2006.
John F. Yanus et al., U.S. Appl. No. 11/593,662 on Overcoated Photoconductors with Thiophosphate Containing Photogenerating Layer, filed Nov. 7, 2006.
Yu Qi et al., U.S. Appl. No. 11/275,546 on Photoreceptor With Overcoat Layer, filed Jan. 13, 2006.

\* cited by examiner

*Primary Examiner* — Mark A Chapman
(74) *Attorney, Agent, or Firm* — Oliff & Berridge, PLC

(57) ABSTRACT

A coating composition that contains a mixture of an alkyl alcohol, a glycol monoether, a charge transport component, a crosslinking component, and at least one hydroxyl containing polymer, and a photoconductor thereof with a supporting substrate, a photogenerating layer, and at least one charge transport layer, and an overcoating layer in contact with and contiguous to the charge transport layer, and which overcoating is comprised of a mixture of an alkyl alcohol, a glycol monoether, an acrylated polyol, a polyalkylene glycol, a crosslinking component, and a charge transport component.

10 Claims, No Drawings

PHOTOCONDUCTORS

CROSS REFERENCE TO RELATED APPLICATIONS

U.S. application Ser. No. 11/593,657, now U.S. Pat. No. 7,785,756, filed Nov. 7, 2006 on Overcoated Photoconductors with Thiophosphate Containing Charge Transport Layers, by John F. Yanus et al.

U.S. application Ser. No. 11/593,875, now U.S. Pat. No. 7,799,497, filed Nov. 7, 2006 on Silanol Containing Overcoated Photoconductors, by John F. Yanus et al.

U.S. application Ser. No. 11/593,656, now U.S. Pat. No. 7,781,132, filed Nov. 7, 2006 on Silanol Containing Charge Transport Overcoated Photoconductors, by John F. Yanus et al.

U.S. application Ser. No. 11/593,662, now U.S. Pat. No. 7,785,757, filed Nov. 7, 2006 on Overcoated Photoconductors With Thiophosphate Containing Photogenerating Layer, by John F. Yanus et al.

A number of the components of the above cross-referenced patent applications, the disclosures of each being totally incorporated herein by reference, such as the supporting substrates, the photogenerating layer pigments and binders, the charge transport layer molecules and binders, the adhesive layer materials, the overcoatings of, for example, patent applications U.S. application Ser. No. 11/593,657, now U.S. Pat. No. 7,785,756; U.S. application Ser. No. 11/593,875, now U.S. Pat. No. 7,799,497, U.S. application Ser. No. 11/593,656, now U.S. Pat. No. 7,781,132, and U.S. application Ser. No. 11/593,662, now U.S. Pat. No. 7,785,757, the disclosures of each application being totally incorporated herein by reference, and the like may be selected for the photoconductors of the present disclosure in embodiments thereof.

BACKGROUND

This disclosure is generally directed to layered imaging members, photoreceptors, photoconductors, and the like. More specifically, the present disclosure is directed to multilayered flexible, belt imaging members, or devices comprised of an optional supporting medium like a substrate, a photogenerating layer, a charge transport layer, including a plurality of charge transport layers, such as a first charge transport layer and a second charge transport layer, an optional adhesive layer, an optional hole blocking or undercoat layer, and an overcoating layer. In embodiments, the overcoating layer contains and is generated from an acrylated polyol, a polyalkylene glycol, a crosslinking component, a charge transport component, and a suitable alcohol mixture, such as a mixture of an alkyl alcohol and DOWANOL®, a series of glycol monoethers, such as 1-methoxy-2-propanol, available from Dow Chemicals.

The photoconductors illustrated herein, in embodiments, have excellent wear resistance, extended lifetimes, elimination or minimization of imaging member scratches, and which scratches can result in undesirable print failures where, for example, the scratches are visible on the final prints generated, and more specifically, increased crack, abrasion, and scratch resistance, minimal leaching of hole transport molecules from the charge transport layer, and the like as compared to similar photoconductors wherein only a glycol monoether is used to formulate the photogenerating dispersion. Additionally, in embodiments the photoconductors disclosed herein possess excellent, and in a number of instances low $V_r$ (residual potential), and allow the substantial prevention of $V_r$ cycle up when appropriate; high sensitivity; low acceptable image ghosting characteristics; low background and/or minimal charge deficient spots (CDS); and desirable toner cleanability.

Also included within the scope of the present disclosure are methods of imaging and printing with the photoresponsive or photoconductors illustrated herein. These methods generally involve the formation of an electrostatic latent image on the imaging member, followed by developing the image with a toner composition comprised, for example, of thermoplastic resin, colorant, such as pigment, charge additive, and surface additives, reference U.S. Pat. Nos. 4,560,635; 4,298,697 and 4,338,390, the disclosures of which are totally incorporated herein by reference, subsequently transferring the image to a suitable substrate, and permanently affixing the image thereto. In those environments wherein the device is to be used in a printing mode, the imaging method involves the same operation with the exception that exposure can be accomplished with a laser device or image bar. More specifically, flexible belts disclosed herein can be selected for the Xerox Corporation iGEN3® machines that generate with some versions over 100 copies per minute. Processes of imaging, especially xerographic imaging and printing, including digital, and/or color printing, are thus encompassed by the present disclosure. The photoconductors are in embodiments sensitive in the wavelength region of, for example, from about 400 to about 900 nanometers, and in particular from about 650 to about 850 nanometers, thus diode lasers can be selected as the light source. Moreover, the photoconductive members of this disclosure are useful in high resolution color xerographic applications, particularly high speed color copying and printing processes.

REFERENCES

There is illustrated in U.S. Pat. No. 7,037,631, the disclosure of which is totally incorporated herein by reference, a photoconductive imaging member comprised of a supporting substrate, a hole blocking layer thereover, a crosslinked photogenerating layer and a charge transport layer, and wherein the photogenerating layer is comprised of a photogenerating component and a vinyl chloride, allyl glycidyl ether, hydroxy containing polymer.

There is illustrated in U.S. Pat. No. 6,913,863, the disclosure of which is totally incorporated herein by reference, a photoconductive imaging member comprised of a hole blocking layer, a photogenerating layer, and a charge transport layer, and wherein the hole blocking layer is comprised of a metal oxide; and a mixture of a phenolic compound and a phenolic resin wherein the phenolic compound contains at least two phenolic groups.

Layered photoconductors have been described in numerous U.S. patents, such as U.S. Pat. No. 4,265,990, the disclosure of which is totally incorporated herein by reference, wherein there is illustrated an imaging member comprised of a photogenerating layer, and an aryl amine hole transport layer. Examples of photogenerating layer components include trigonal selenium, metal phthalocyanines, vanadyl phthalocyanines, and metal free phthalocyanines.

Further, in U.S. Pat. No. 4,555,463, the disclosure of which is totally incorporated herein by reference, there is illustrated a layered imaging member with a chloroindium phthalocyanine photogenerating layer. In U.S. Pat. No. 4,587,189, the disclosure of which is totally incorporated herein by reference, there is illustrated a layered imaging member with, for example, a perylene, pigment photogenerating component. Both of the aforementioned patents disclose an aryl amine component, such as N,N'-diphenyl-N,N'-bis(3-methylphenyl)-1,1'-biphenyl-4,4'-diamine dispersed in a polycarbonate binder as a hole transport layer. The above components, such as the photogenerating compounds and the aryl amine charge transport, can be selected for the imaging members of the present disclosure in embodiments thereof.

In U.S. Pat. No. 4,921,769, the disclosure of which is totally incorporated herein by reference, there are illustrated photoconductive imaging members with blocking layers of certain polyurethanes.

Illustrated in U.S. Pat. No. 5,521,306, the disclosure of which is totally incorporated herein by reference, is a process for the preparation of Type V hydroxygallium phthalocyanine comprising the in situ formation of an alkoxy-bridged gallium phthalocyanine dimer, hydrolyzing the dimer to hydroxygallium phthalocyanine, and subsequently converting the hydroxygallium phthalocyanine product to Type V hydroxygallium phthalocyanine.

Illustrated in U.S. Pat. No. 5,482,811, the disclosure of which is totally incorporated herein by reference, is a process for the preparation of hydroxygallium phthalocyanine photogenerating pigments which comprises hydrolyzing a gallium phthalocyanine precursor pigment by dissolving the hydroxygallium phthalocyanine in a strong acid, and then reprecipitating the resulting dissolved pigment in basic aqueous media; removing any ionic species formed by washing with water; concentrating the resulting aqueous slurry comprised of water and hydroxygallium phthalocyanine to a wet cake; removing water from said slurry by azeotropic distillation with an organic solvent, and subjecting said resulting pigment slurry to mixing with the addition of a second solvent to cause the formation of said hydroxygallium phthalocyanine polymorphs.

Also, in U.S. Pat. No. 5,473,064, the disclosure of which is totally incorporated herein by reference, there is illustrated a process for the preparation of photogenerating pigments of hydroxygallium phthalocyanine Type V essentially free of chlorine, whereby a pigment precursor Type I chlorogallium phthalocyanine is prepared by reaction of gallium chloride in a solvent, such as N-methylpyrrolidone, present in an amount of from about 10 parts to about 100 parts, and preferably about 19 parts with 1,3-diiminoisoindolene ($DI^3$) in an amount of from about 1 part to about 10 parts, and preferably about 4 parts of $DI^3$, for each part of gallium chloride that is reacted; hydrolyzing the pigment precursor chlorogallium phthalocyanine Type I by standard methods, for example acid pasting, whereby the pigment precursor is dissolved in concentrated sulfuric acid and then reprecipitated in a solvent, such as water, or a dilute ammonia solution, for example from about 10 to about 15 percent; and subsequently treating the resulting hydrolyzed pigment hydroxygallium phthalocyanine Type I with a solvent, such as N,N-dimethylformamide, present in an amount of from about 1 volume part to about 50 volume parts, and preferably about 15 volume parts for each weight part of pigment hydroxygallium phthalocyanine that is used by, for example, ball milling the Type I hydroxygallium phthalocyanine pigment in the presence of spherical glass beads, approximately 1 millimeter to 5 millimeters in diameter, at room temperature, about 25° C., for a period of from about 12 hours to about 1 week, and preferably about 24 hours.

The appropriate components, and processes of the above recited patents may be selected for the present disclosure in embodiments thereof.

SUMMARY

Disclosed are photoconductors with many of the advantages illustrated herein, such as extended lifetimes of service of, for example, in excess of about 100,000 imaging cycles; excellent electronic characteristics; stable electrical properties; low image ghosting; low background and/or minimal charge deficient spots (CDS); resistance to charge transport layer cracking upon exposure to the vapor of certain solvents; excellent surface characteristics; improved wear resistance; compatibility with a number of toner compositions; the avoidance of or minimal imaging member scratching characteristics; consistent $V_r$ (residual potential) that is substantially flat or no change over a number of imaging cycles as illustrated by the generation of known PIDCs (Photo-Induced Discharge Curve); minimum cycle up in residual potential; acceptable background voltage that is, for example, a minimum background voltage of about 2.6 milliseconds after exposure of the photoconductor to a light source; rapid PIDCs together with low residual voltages, and the like.

Also disclosed are layered photoconductors which are responsive to near infrared radiation of from about 700 to about 900 nanometers.

Further, disclosed are layered flexible photoresponsive imaging members with sensitivity to visible light.

Moreover, disclosed are layered belt photoresponsive or photoconductive imaging members with mechanically robust and solvent resistant charge transport layers.

Additionally disclosed are flexible imaging members with optional hole blocking layers comprised of metal oxides, phenolic resins, and optional phenolic compounds, and which phenolic compounds contain at least two, and more specifically, two to ten phenol groups or phenolic resins with, for example, a weight average molecular weight ranging from about 500 to about 3,000 permitting, for example, a hole blocking layer with excellent efficient electron transport which usually results in a desirable photoconductor low residual potential $V_{low}$.

Also disclosed are layered flexible belt photoreceptors wherein there is permitted the prevention of V, cycle up caused primarily by photoconductor aging, for numerous imaging cycles, and layered flexible belt photoreceptors, and where the resulting photoconductor members exhibit low background and/or minimal CDS; and the prevention of $V_r$ cycle up, caused primarily by photoconductor aging, for numerous imaging cycles.

EMBODIMENTS

Aspects of the present disclosure relate to a coating composition comprising a mixture of an alkyl alcohol, a glycol monoether, a charge transport component, a crosslinking component, and at least one hydroxyl containing polymer; a photoconductor comprising in sequence a substrate, a photogenerating layer, and at least one charge transport layer comprised of at least one charge transport component, and an overcoat layer in contact with and contiguous to the top charge transport layer wherein the overcoat layer is comprised of a mixture of a charge transport component, a crosslinking component, and at least a hydroxyl containing polymer, and wherein the coating is formed by applying in the presence of an organic acid catalyst a composition comprising a mixture of an alkyl alcohol, a glycol monoether, a crosslinking component, a charge transport component, and at least one of (i) a polyester, and (ii) an acrylated polyol; a photoconductor wherein the overcoating components are heated, and which coating is crosslinked; a photoconductor wherein the heating is at a temperature of from about 100° C. to about 180° C.; a photoconductor wherein the coating is comprised of a mixture of (i) 2-propanol;
(ii) 1-methoxy-2-propanol;
(iii) a crosslinking component represented by

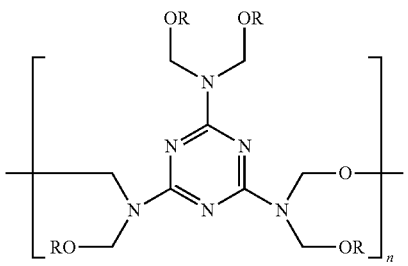

wherein R is selected from the group consisting of hydrogen, alkyl of, for example, methyl, ethyl, propyl, butyl, and mixtures thereof; and n represents the number of repeating units of from, for example, 1 to about 100;

(iv) a charge transport component selected from the group consisting of (A) and (B)

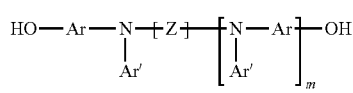 (A)

wherein m is zero or 1; Z is selected from the group consisting of at least one of

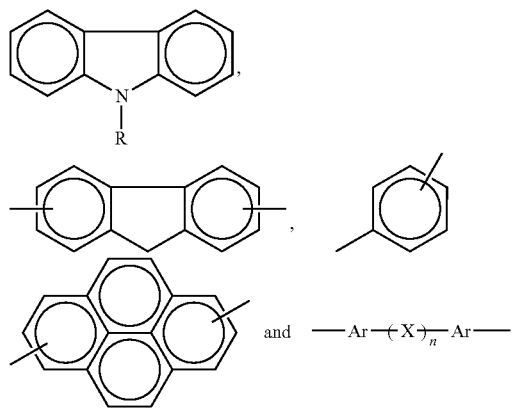

wherein n is 0 or 1; Ar is selected from the group consisting of at least one of

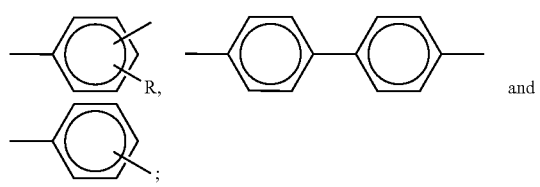

R is selected from the group consisting of at least one of alkyl of $-CH_3$, $-C_2H_5$, $-C_3H_7$, and $C_4H_9$, and Ar' is selected from the group consisting of at least one of

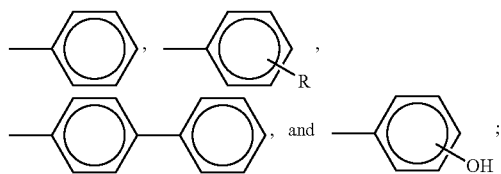

and X is selected from the group consisting of at least one of

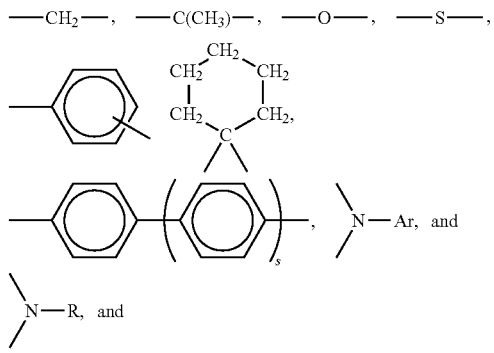

wherein S is zero, 1, or 2; and wherein the alkyl of the alkyl alcohol contains from 1 to about 12 carbon atoms, and which alcohol is present, for example, in an amount of from about 0.5 to about 15 weight percent; and $$Q\text{-}[L\text{-}OH]_n \qquad (B)$$

wherein L represents a divalent linkage group having from 1 to about 10 carbons; n represents a number of from 1 to about 5, and Q is represented by the following general formula

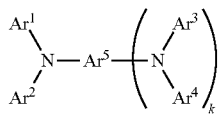

wherein $Ar^1$, $Ar^2$, $Ar^3$, $Ar^4$, and $Ar^5$ each independently represents a substituted or unsubstituted aryl group, or wherein $Ar^5$ independently represents a substituted or unsubstituted arylene group; and k represents 0 or 1; and wherein at least one of $Ar^1$, $Ar^2$, $Ar^3$ and $Ar^4$ is connected to the linkage group;

(v) an acrylated polyol represented by

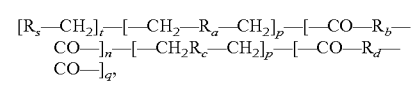

where $R_s$ represents $CH_2CR_1CO_2-$; where t is equal to 0 to 1 and represents the number of mole fraction acrylic groups on available sites; and where $R_a$ and $R_c$ independently represent at least one of a linear alkyl group, a linear alkoxy group, a branched alkyl group, and a branched alkoxy group; wherein each alkyl and alkoxy group contains from about 1 to about 20 carbon atoms; $R_b$ and $R_d$ independently represent at least one of an alkyl and alkoxy wherein the alkyl and the alkoxy each contain from about 1 to about 20 carbon atoms; and m, n, p, and q represent mole fractions of from 0 to 1, such that n+m+p+q is equal to 1; and (vi) a polypropylene glycol possessing a weight average molecular weight of from about 400 to about 5,000; and wherein (vii) the polypropylene glycol is present in an amount of from about 25 to about 50 weight percent of the total weight of said polypropylene glycol and the acrylated polyol; and (viii) wherein the charge transport component is present in an amount of from about 30 to about 45 weight percent of the total weight of the charge transport component, the crosslinking component, the polypropylene glycol, and the acrylated polyol; a photoconductor wherein the coating is comprised of a mixture of (i) 2-propanol;

(ii) 1-methoxy-2-propanol;

(iii) a crosslinking component of

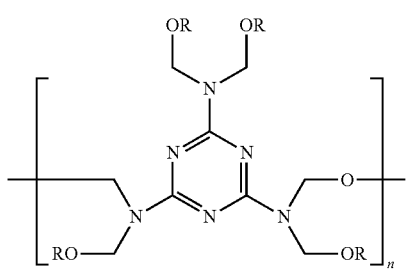

wherein R is selected from the group consisting of hydrogen, alkyl of, for example, methyl, ethyl, propyl, butyl, and mixtures thereof, and n is the number of repeating units of from 1 to about 100;

(iv) a charge transport component selected from the group consisting of (A) and (B)

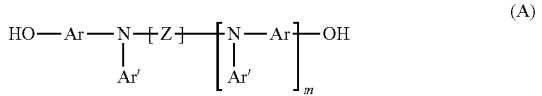

(A)

wherein m is zero or 1; Z is selected from the group consisting of at least one of

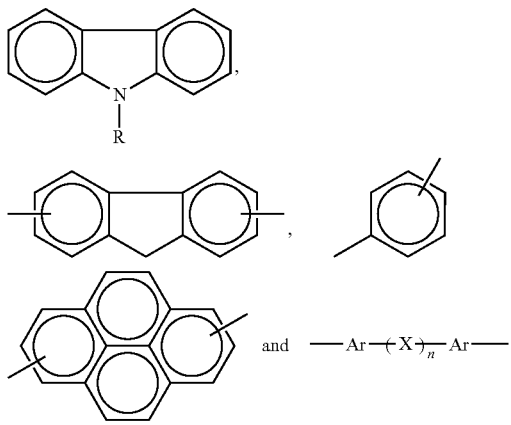

wherein n is 0 or 1; Ar is selected from the group consisting of at least one of

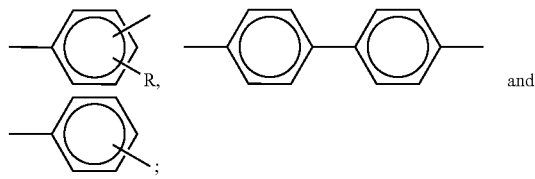

and

R is selected from the group consisting of at least one of $-CH_3$, $-C_2H_5$, $-C_3H_7$, and $C_4H_9$, and Ar' is selected from the group consisting of at least one of

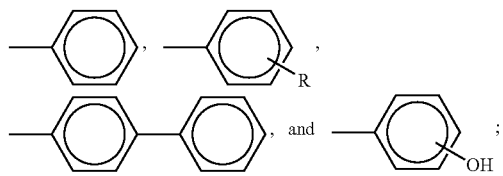

and X is selected from the group consisting of at least one of

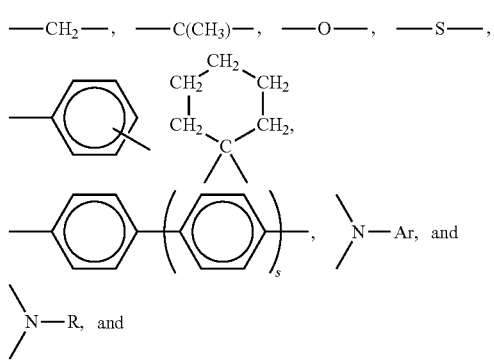

wherein S is zero, 1, or 2; and wherein the alkyl of the alkyl alcohol contains from 1 to about 12 carbon atoms, and which alcohol is present in an amount of from about 0.5 to about 12 weight percent; and Q$-$[L$-$OH]$_n$ (B)

wherein L represents a divalent linkage group with from 2 to about 12 carbon atoms; n represents a number of from 1 to about 5; and Q is represented by the following general formula

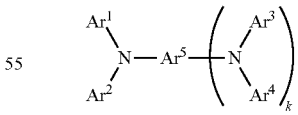

wherein $Ar^1$, $Ar^2$, $Ar^3$, $Ar^4$, and $Ar^5$ each independently represents a substituted or unsubstituted aryl group, or wherein $Ar^5$ independently represents a substituted or unsubstituted arylene group; and k represents 0 or 1, wherein at least one of $Ar^1$, $Ar^2$, $Ar^3$, and $Ar^4$ is connected to the linkage group;

(v) a hydroxyl-containing polyester; and wherein the hydroxyl containing polyester possesses a hydroxyl number of from about 10 to about 1,000, and a saturated polyester; and wherein (vi) the 2-propanol is present in an amount of from about 5 to about 55 weight percent of the total weight of the 2-propanol and 1-methoxy-2-propanol;

(vii) the saturated polyester is present in an amount of from about 25 to about 50 weight percent of the total weight of the saturated polyester and the hydroxyl-containing polyester; and (viii) the charge transport component is present in an amount of from about 30 to about 45 weight percent of the total weight of the charge transport component, the crosslinking component, the saturated polyester and the hydroxyl-containing polyester; a photoconductor wherein the coating composition is comprised of a mixture of (i) propanol;

(ii) a methoxy propanol;

(iii) a crosslinking component represented by

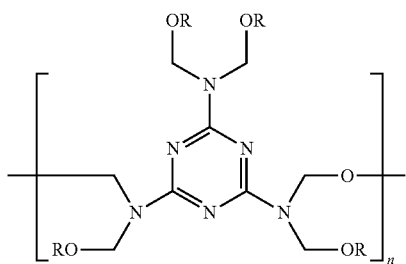

wherein R is selected from the group consisting of hydrogen, alkyl, and mixtures thereof; and n represents the number of repeating units of from 1 to about 100;

(iv) a charge transport component of (A) or (B)

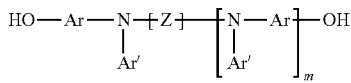 (A)

wherein m is zero or 1; Z is selected from the group consisting of at least one of

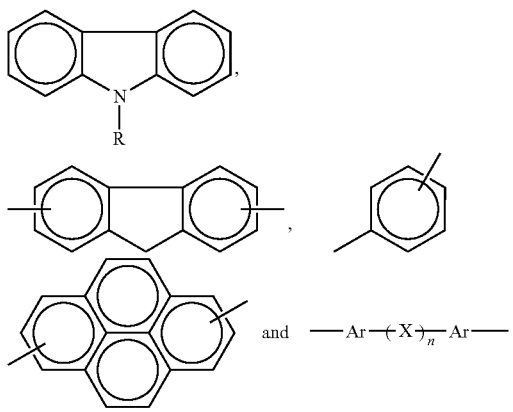

wherein n is 0 or 1; Ar is selected from the group consisting of at least one of

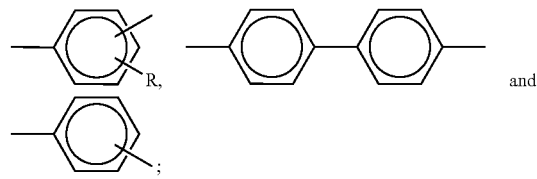

R is selected from the group consisting of at least one of —$CH_3$, —$C_2H_5$, —$C_3H_7$, and $C_4H_9$, and Ar' is selected from the group consisting of at least one of

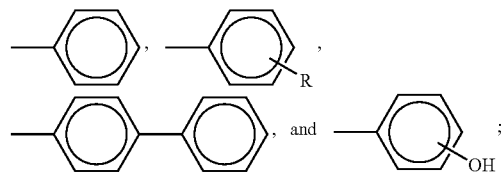

and X is selected from the group consisting of at least one of

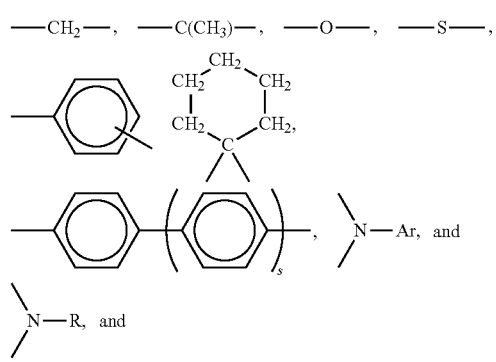

wherein S is zero, 1, or 2; and wherein the alkyl of said alkyl alcohol contains from 1 to about 12 carbon atoms, and which alcohol is present in an amount of from about 0.5 to about 12 weight percent; or Q–[L–OH]$_n$ (B)

wherein L represents a divalent linkage group having from 1 to about 10 carbons; n represents a number of from 1 to about 5; and Q is represented by the following general formula

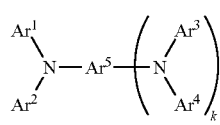

wherein $Ar^1$, $Ar^2$, $Ar^3$, $Ar^4$, and $Ar^5$ each independently represents a substituted or unsubstituted aryl group, or $Ar^5$ independently represents a substituted or unsubstituted arylene group; and k represents 0 or 1, wherein at least one of $Ar^1$, $Ar^2$, $Ar^3$, and $Ar^4$ is connected to the linkage group;

(v) an acrylated polyol represented by

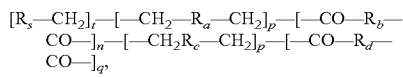

where $R_s$ represents $CH_2CR_1CO_2$—; where t is equal to 0 to 1 and represents the mole fraction acrylic groups on available sites; and where $R_a$ and $R_c$ independently represent at least one of a linear alkyl group, a linear alkoxy group, a branched alkyl group, and a branched alkoxy group, wherein each alkyl and alkoxy group contain from about 1 to about 20 carbon atoms; $R_b$ and $R_d$ independently represent at least one of an alkyl and alkoxy wherein the alkyl and the alkoxy each contain from about 1 to about 20 carbon atoms; and m, n, p, and q represent mole fractions of from 0 to 1, such that n+m+p+q=1; and (vi) a saturated polyester; and wherein (vii) the 2-propanol is present in an amount of from about 10 to about 75 weight percent of the total weight of the 2-propanol, and of the 1-methoxy-2-propanol;

(viii) the saturated polyester is present in an amount of from about 25 to about 50 weight percent of the total weight of the saturated polyester and the acrylated polyol; and (ix) wherein the charge transport component is present in an amount of from about 30 to about 45 weight percent of the total weight of the charge transport component, the crosslinking component, the saturated polyester, and the acrylated polyol; a photoconductor wherein the charge transport layer comprises aryl amine molecules, and which aryl amines are comprised of at least one of

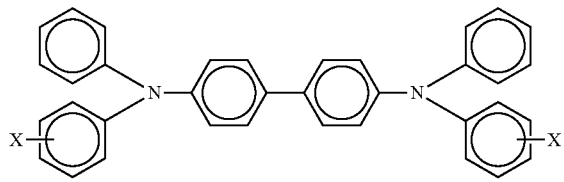

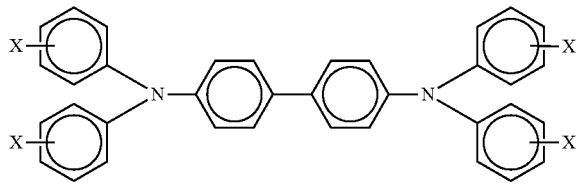

wherein X is selected from the group consisting of at least one of alkyl, alkoxy, aryl, and halogen; a photoconductor wherein the charge transport component is selected from the group consisting of at least one of N,N'-bis(4-butylphenyl)-N,N'-di-p-tolyl-[p-terphenyl]-4,4'-diamine, N,N'-bis(4-butylphenyl)-N,N'-di-m-tolyl-[p-terphenyl]-4,4'-diamine, N,N'-bis(4-butylphenyl)-N,N'-di-o-tolyl-[p-terphenyl]-4,4'-diamine, N,N'-bis(4-butylphenyl)-N,N'-bis-(4-isopropylphenyl)-[p-terphenyl]-4,4'-diamine, N,N'-bis(4-butylphenyl)-N,N'-bis-(2-ethyl-6-methylphenyl)-[p-terphenyl]-4,4'-diamine, N,N'-bis(4-butylphenyl)-N,N'-bis-(2,5-dimethylphenyl)-[p-terphenyl]-4,4'-diamine, and N,N'-diphenyl-N,N'-bis(3-chlorophenyl)-[p-terphenyl]-4,4'-diamine; a photoconductor wherein the charge transport component is N,N'-diphenyl-N,N-bis(3-methylphenyl)-1,1'-biphenyl-4,4'-diamine; a photoconductor wherein the transport layer comprises at least one of

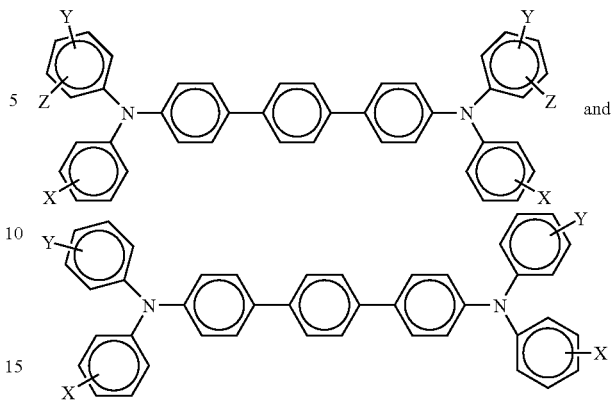

wherein each X, Y and Z is independently selected from the group consisting of at least one of alkyl, alkoxy, aryl, and halogen, and mixtures thereof, and wherein the overcoat layer has a thickness from about 1 micron to about 5 microns; a photoconductor comprised of a photogenerating layer, a charge transport layer, and a layer comprised of a mixture of a charge transport compound, a crosslinked component, and a hydroxyl containing polymer, an alkyl alcohol, and a glycol ether; a photoconductor comprised in sequence of a substrate, a photogenerating layer, and at least one charge transport layer, such as from about 1 to about 5 layers, and more specifically 1 layer, 2 layers, or 3 layers comprised of at least one charge transport component, and a overcoating layer in contact with and contiguous to the charge transport layer, and wherein the overcoating layer is formed from a dispersion of an acrylated polyol, a polyalkylene glycol, a crosslinking component, a catalyst, a charge transport component, and a mixture of a glycol monoether and an alkyl alcohol. Yet more specifically, the overcoating formulation comprises (i) a hydroxyl containing polymer (polyesters and acrylic polyols) also referred to in embodiments as a polyol; (ii) a melamine-formaldehyde curing agent, and a (iii) hole transport material substantially dissolved in a mixture of DOWANOL®, and at least one additional compatible alcohol. The aforementioned alcohol mixture comprises, for example, from about 90 to about 99 weight percent, from about 5 weight percent to about 95 weight percent, from about 15 to about 75, or from about 20 to about 60 weight percent of a glycol monoether, and from about 1 to about 10 weight percent, from about 95 weight percent to about 5 weight percent, from about 85 to about 25, or from about 80 to about 40 weight percent of the alcohol, such as an alkyl alcohol, like isopropanol, and where the total of the mixture of the glycol monoether and the alcohol is about 100 percent. The inclusion of the alcohol in the composition prevents or reduces, for example, the occurrence of haze in the overcoated or coated film. In embodiments, the alkyl alcohol selected has a boiling point lower than that of the DOWANOL®.

The hydroxyl containing polymer or the polyol, which primarily functions as a binder, can, for example, comprise a branched polyester polyol, typically bearing hydroxyl groups (such as the branched polyester polyol DESMOPHEN® 800 available from Bayer), or an acrylated polyol (such as 7558-B60 available from OPC Polymers, or JONCRYL® 587 or JONCRYL® 510 available from Johnson Polymers). Typically, the coating formulation further comprises a co-binder, such as for example, from about 10 weight percent to about 90 weight percent of the total weight of the branched polyester first binder, and a second co-binder of a linear saturated polyester polyol like DESMOPHEN® 1652A available from Bayer, or an alkylene glycol, such as polypropylene Glycol PPG2000. The melamine-formaldehyde curing agent can, for example, be CYMEL® 1130 or CYMEL® 303 available from Cytec. The hole transport material can, for example, comprise a tertiary aromatic amine, such as a dihydroxy tertiary arylamine (DHTPD), or a charge transport material represented by the general formula

wherein Q represents a charge transport component, L represents a divalent group, O represents oxygen, and n represents the number of repeating segments or groups, such as, for example, a dihydroxymethyl-triphenylamine (DHM-TPA) like 4,4'-(3,4-dimethylphenylazanediyl)bis(4,1-phenylene) dimethanol. In embodiments, the additional alcohol can be any suitable primary, secondary or tertiary alcohol that, for example, has a lower capacity to leach out the small hole transport molecules from the charge transport layer as compared to the use of DOWANOL® PM alone. The additional alcohol can be selected such that it has a boiling point lower than that of DOWANOL® with a boiling point of about 118° C. Suitable alcohols possess a boiling point of, for example, from about 80 to about 120° C. It is believed that the mixing of, for example, a 1-methoxy-2-propanol (DOWANOL® PM) with a lower boiling point alcohol can decrease the drying time of the overcoating layer, and consequently reduce the time available for the undesirable leaching of the hole transport molecules from the charge transport layer. Also, in embodiments, the additional alcohol selected can possess a density of from about 0.6 to about 1.1 gm/cm$^3$, and for example, from about 0.75 to about 0.95 gm/cm$^3$. In embodiments, the density of the additional alcohol is, for example, from about 0.91 to about 0.93 gm/cm$^3$, and the density of DOWANOL® PM is, for example, from about 0.85 to about 0.95 gm/cm$^3$, and it is believed that using an additional alcohol that has a comparable density can provide desirable compatibility features with the other overcoating layer components. Suitable additional alcohols that can be used, according to embodiments, include 2-propanol (IPA), tertiary-butanol, and 2-pentanol. Alcohol examples include alkyl alcohols, wherein alkyl contains, for example, from 1 to about 7 carbon atoms, from 1 to about 5 carbon atoms, such as 2-propanol [boiling point 82° C.], sec-butanol [boiling point 100° C.], tert-butanol [boiling point 83° C.], iso-butanol [boiling point 108° C.], iso-pentanol [boiling point 132° C.], tert-pentanol [boiling point 102° C.], and the like, isomers thereof, derivatives thereof, and mixtures thereof. Typically, these additional alcohols constitute from about 1 weight percent to about 50 weight percent of the solvent mixture (excluding the solid content of the formulation). To improve the crack resistance of the overcoating layer, it may be desirable in embodiments to incorporate the alcohols in an amount of no more than about 15 weight percent of the solvent mixture. Examples of glycol monoethers are 1-propoxy-2-propanol, 1-methoxy-2-butanol, 1-phenoxy-2-propanol, di(propylene glycol) butyl ether, di(propylene glycol) methyl ether, and diethylene glycol butyl ether In embodiments, there are disclosed photoconductors comprised of an overcoating layer that can be formed by the reaction of a polyol, a polyalkylene, a crosslinking agent, and a charge transport compound in the presence of a catalyst resulting in a polymeric network primarily containing a branched polyester polyol or an acrylate polyol, the linear polyester polyol or the glycol, and a charge transport compound, and adding thereto a mixture of the alkyl alcohol and the glycol monoether, and where the overcoating charge transport component can be selected from a number of known charge transport compounds, such as the same hole transport molecules like aryl amines selected for the charge transport layer as illustrated herein, or

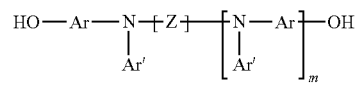

wherein m represents the number of repeating units, such as for example, zero or 1; Z is selected from the group consisting of at least one of

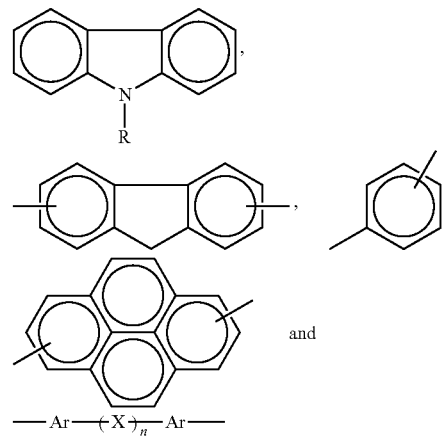

wherein n represents the number of repeating units, such as for example, 0 or 1; Ar is selected from the group consisting of at least one of

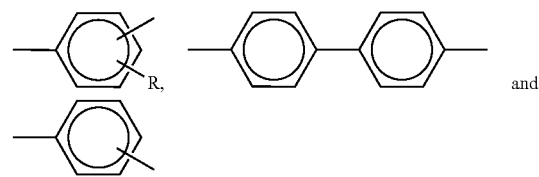

wherein R is selected from the group consisting of at least one of alkyl, such as CH$_3$, —C$_2$H$_5$, —C$_3$H$_7$, and C$_4$H$_9$; and Ar' is selected from the group consisting of at least one of

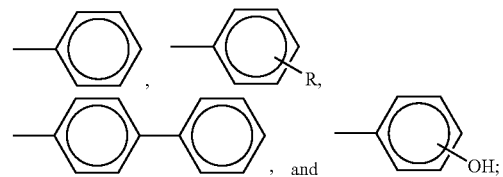

and X is selected from the group consisting of at least one of

-continued

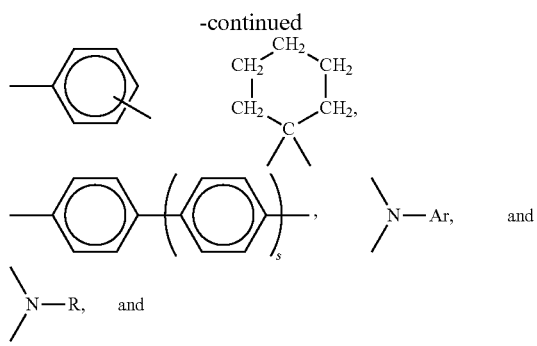

wherein S represents the number of repeating units and is, for example, zero, 1, or 2; an overcoated photoconductor wherein at least one charge transport layer is comprised of from 2 to about 4 layers, and a layer in contact with and contiguous to the top charge transport layer, and which layer is formed from a mixture of an alcohol and a glycol monoether, and the reaction of a branched polyester polyol or acrylate polyol, a linear polyester polyol or polyalkylene glycol, a crosslinking agent, and a charge transport compound in the presence of a catalyst; an overcoating composition comprised of an alcohol in an amount of from about 2 to about 40 weight percent, and a glycol monoether present in an amount of from about 10 to about 70 weight percent, and where the reaction of the branched polyester polyol or acrylate polyol is present in an amount of, for example, from about 5 to about 20 weight percent, a linear polyester polyol or polyalkylene glycol present in an amount of from about 1 to about 7 weight percent, a crosslinking agent present in an amount of from about 4 to about 9 weight percent, a charge transport compound present in an amount of from about 7 to about 15 weight percent, and wherein the catalyst is selected in an amount of from about 1 to about 4 weight percent thereby resulting in a polymeric network; a photoconductor comprised in sequence of a supporting substrate, a photogenerating layer comprised of at least one photogenerating pigment, thereover a charge transport layer comprised of at least one charge transport component, and a top or overcoating protective layer in contact with and contiguous to the top charge transport layer, and which layer is formed from a mixture of an alkylalcohol and a glycol monoether, and crosslinked polymer, which can be formed by the reaction of a branched polyester polyol or an acrylate polyol, a linear polyester or a polyalkylene glycol, a crosslinking agent, and a charge transport compound in the presence of a catalyst resulting in the overcoating primarily containing the branched polyester polyol or the acrylate polyol, the linear polyester or the glycol, the crosslinking agent, the charge transport, the alkyl alcohol, and the glycol monoether; a photoconductor wherein the acrylated polyol is represented by

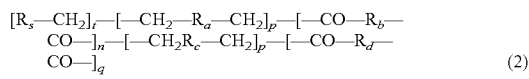

(2)

where $R_s$ represents $CH_2CR_1CO_2$—; where t=0 to 1 and represents the mole fraction of the acrylic groups on available sites; and where $R_a$ and $R_c$ independently represent at least one of a linear alkyl group, a linear alkoxy group, a branched alkyl group, and a branched alkoxy group, wherein each alkyl and alkoxy group contain from about 1 to about 20 carbon atoms; $R_b$ and $R_d$ independently represent at least one of an alkyl and alkoxy wherein said alkyl and said alkoxy each contain from about 1 to about 20 carbon atoms; and m, n, p, and q represent mole fractions of from 0 to 1, such that n+m+p+q=1; a photoconductor containing a top overcoating layer or TOC, and which overcoating contains primarily a branched polyester polyol or an acrylated polyol, a linear polyester, or a polyalkylene glycol, wherein alkylene contains, for example, from 1 to about 10 carbon atoms, and more specifically, from 1 to about 4 carbon atoms, a charge transport compound, such as a hole transport compound, and minor amounts of a catalyst, a crosslinking agent, an alkyl alcohol, and a glycol monoether; a photoconductive member comprised of a substrate, a photogenerating layer thereover, at least one to about three charge transport layers thereover, a hole blocking layer, an adhesive layer wherein in embodiments the adhesive layer is situated between the photogenerating layer and the hole blocking layer, with the photogenerating layer including a photogenerating component, such as a photogenerating pigment and a resin binder, and the at least one charge transport layer including at least one charge transport component, such as a hole transport component, a resin binder, and known additives like antioxidants, and in contact with the entire surface of the charge transport layer a top overcoating protective layer as illustrated herein.

In embodiments thereof, there is disclosed a photoconductive imaging member comprised of a supporting substrate, a photogenerating layer thereover, a charge transport layer, and an overcoating polymer layer; a photoconductive member with a photogenerating layer of a thickness of from about 0.25 to about 10 microns, at least one transport layer each of a thickness of from about 5 to about 100 microns; a xerographic imaging apparatus containing a charging component, a development component, a transfer component, and a fixing component, and wherein the apparatus contains a photoconductive imaging member comprised of a supporting substrate, and thereover a layer comprised of a photogenerating pigment and a charge transport layer or layers, and thereover an overcoating layer, and where the transport layer is of a thickness of from about 40 to about 75 microns; a member wherein the photogenerating layer contains a photogenerating pigment present in an amount of from about 10 to about 95 weight percent; a member wherein the thickness of the photogenerating layer is from about 0.5 to about 4 microns; a member wherein the photogenerating layer contains an inactive polymer binder; a member wherein the binder is present in an amount of from about 50 to about 90 percent by weight, and wherein the total of all layer components is about 100 percent; a member wherein the photogenerating component is a hydroxygallium phthalocyanine that absorbs light of a wavelength of from about 370 to about 950 nanometers; an imaging member wherein the supporting substrate is comprised of a conductive substrate comprised of a metal; an imaging member wherein the conductive substrate is aluminum, aluminized polyethylene terephthalate or titanized polyethylene terephthalate; an imaging member wherein the photogenerating resinous binder is selected from the group consisting of known suitable polymers like polyesters, polyvinyl butyrals, polycarbonates, polystyrene-b-polyvinyl pyridine, and polyvinyl formals; an imaging member wherein the photogenerating pigment is a metal free phthalocyanine; an imaging member wherein each of the charge transport layers, especially a first and second layer, or a single charge transport layer and the charge transport compound in the charge transport layer and/or in the overcoating layer comprises

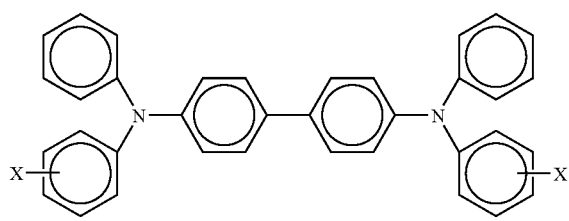

wherein X is selected from the group consisting of alkyl, alkoxy, and halogen, such as methyl and chloride; an imaging member wherein alkyl and alkoxy contain from about 1 to about 15 carbon atoms; an imaging member wherein alkyl contains from about 1 to about 5 carbon atoms; an imaging member wherein alkyl is methyl; an imaging member wherein each or at least one of the charge transport layers, especially a first and second charge transport layer, or a single charge transport layer, and the overcoating charge transport compound comprises

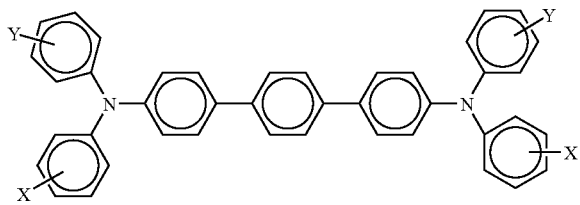

wherein X and Y are independently alkyl, alkoxy, aryl, a halogen, or mixtures thereof; an imaging member wherein, for example, alkyl and alkoxy contains from about 1 to about 15 carbon atoms; alkyl contains from about 1 to about 5 carbon atoms; and wherein the resinous binder is selected from the group consisting of polycarbonates and polystyrene; an imaging member wherein the photogenerating pigment present in the photogenerating layer is comprised of chlorogallium phthalocyanine, or Type V hydroxygallium phthalocyanine prepared by hydrolyzing a gallium phthalocyanine precursor by dissolving the hydroxygallium phthalocyanine in a strong acid, and then reprecipitating the resulting dissolved precursor in a basic aqueous media; removing the ionic species formed by washing with water; concentrating the resulting aqueous slurry comprised of water and hydroxygallium phthalocyanine to a wet cake; removing water from the wet cake by drying; and subjecting the resulting dry pigment to mixing with the addition of a second solvent to cause the formation of the hydroxygallium phthalocyanine; an imaging member wherein the Type V hydroxygallium phthalocyanine has major peaks, as measured with an X-ray diffractometer, at Bragg angles (2Θ+/−0.2°) 7.4, 9.8, 12.4, 16.2, 17.6, 18.4, 21.9, 23.9, 25.0, 28.1 degrees, and the highest peak at 7.4 degrees; a method of imaging wherein the imaging member is exposed to light of a wavelength of from about 400 to about 950 nanometers; a member wherein the photogenerating layer is situated between the substrate and the charge transport; a member wherein the charge transport layer is situated between the substrate and the photogenerating layer, and wherein the number of charge transport layers is two; a member wherein the photogenerating layer is of a thickness of from about 5 to about 25 microns; a member wherein the photogenerating component amount is from about 0.05 weight percent to about 20 weight percent, and wherein the photogenerating pigment is dispersed in from about 10 weight percent to about 80 weight percent of a polymer binder; a member wherein the thickness of the photogenerating layer is from about 1 to about 11 microns; a member wherein the photogenerating and charge transport layer components are contained in a polymer binder; a member wherein the binder is present in an amount of from about 50 to about 90 percent by weight, and wherein the total of the layer components is about 100 percent, and wherein the photogenerating resinous binder is selected from the group consisting of polyesters, polyvinyl butyrals, polycarbonates, polystyrene-b-polyvinyl pyridine, and polyvinyl formals; an imaging member wherein the photogenerating component is Type V hydroxygallium phthalocyanine, or chlorogallium phthalocyanine, and the charge transport layer and/or overcoating contains a hole transport of N,N'-diphenyl-N,N-bis (3-methylphenyl)-1,1'-biphenyl-4,4'-diamine, N,N'-bis(4-butylphenyl)-N,N'-di-p-tolyl-[p-terphenyl]-4,4"-diamine, N,N'-bis(4-butylphenyl)-N,N'-di-m-tolyl-[p-terphenyl]-4, 4"-diamine, N,N'-bis(4-butylphenyl)-N,N'-di-o-tolyl-[p-terphenyl]-4,4"-diamine, N,N'-bis(4-butylphenyl)-N,N'-bis-(4-isopropylphenyl)-[p-terphenyl]-4,4"-diamine, N,N'-bis(4-butylphenyl)-N,N'-bis-(2-ethyl-6-methylphenyl)-[p-terphenyl]-4,4"-diamine, N,N'-bis(4-butylphenyl)-N,N'-bis-(2,5-dimethylphenyl)-[p-terphenyl]-4,4"-diamine, N,N'-diphenyl-N,N'-bis(3-chlorophenyl)-[p-terphenyl]-4,4"-diamine molecules, and wherein the hole transport resinous binder is selected from the group consisting of polycarbonates and polystyrene; an imaging member wherein the photogenerating layer contains a metal free phthalocyanine; an imaging member wherein the photogenerating layer contains an alkoxygallium phthalocyanine; a photoconductive imaging member with a blocking layer contained as a coating on a substrate, and an adhesive layer coated on the blocking layer; an imaging member further containing an adhesive layer and a hole blocking layer; a color method of imaging which comprises generating an electrostatic latent image on the imaging member, developing the latent image, transferring, and fixing the developed electrostatic image to a suitable substrate; photoconductive imaging members comprised of a supporting substrate, a photogenerating layer, a hole transport layer, and a top overcoating layer in contact with the hole transport layer, or in embodiments in contact with the photogenerating layer, and in embodiments wherein a plurality of charge transport layers are selected, such as, for example, from 2 to about 10, and more specifically, 2 may be selected; and a photoconductive imaging member comprised of an optional supporting substrate, a photogenerating layer, and a first, second, or third charge transport layer, and the overcoating layer as illustrated herein.

The thickness of the photoconductor substrate layer depends on many factors, including economical considerations, electrical characteristics, and the like, thus this layer may be of a substantial thickness, for example over 3,000 microns, such as from about 1,000 to about 2,000 microns, from about 500 to about 900 microns, from about 300 to about 700 microns, or of a minimum thickness. In embodiments, the thickness of this layer is from about 75 microns to about 300 microns, or from about 100 microns to about 150 microns.

The substrate may be opaque or substantially transparent, and may comprise any suitable material. Accordingly, the substrate may comprise a layer of an electrically nonconductive or conductive material, such as an inorganic or an organic composition. As electrically nonconducting materials, there may be employed various resins known for this purpose including polyesters, polycarbonates, polyamides, polyurethanes, and the like, which are flexible as thin webs. An electrically conducting substrate may be any suitable metal of, for example, aluminum, nickel, steel, copper, and the like, or a polymeric material, as described above, filled with an electrically conducting substance, such as carbon, metallic powder, and the like, or an organic electrically conducting material. The electrically insulating or conductive substrate may be in the form of an endless flexible belt, a web, a rigid cylinder, a sheet, and the like. The thickness of the substrate layer depends on numerous factors, including strength desired, and economical considerations. For a drum, as disclosed in a copending application referenced herein, this layer may be of a substantial thickness of, for example, up to many centimeters or of a minimum thickness of less than a millimeter. Similarly, a flexible belt may be of a substantial thickness of, for example, about 250 microns, or of minimum thickness of less than about 50 microns, provided there are no adverse effects on the final electrophotographic device.

In embodiments where the substrate layer is not conductive, the surface thereof may be rendered electrically conductive by an electrically conductive coating. The conductive coating may vary in thickness over substantially wide ranges depending upon the optical transparency, degree of flexibility desired, and economic factors.

Illustrative examples of substrates are as illustrated herein, and more specifically, layers selected for the imaging members of the present disclosure, and which substrates can be opaque or substantially transparent comprise a layer of insulating material including inorganic or organic polymeric materials, such as MYLAR® a commercially available polymer, MYLAR® containing titanium, a layer of an organic or inorganic material having a semiconductive surface layer, such as indium tin oxide or aluminum arranged thereon, or a conductive material inclusive of aluminum, chromium, nickel, brass, or the like. The substrate may be flexible, seamless, or rigid, and may have a number of many different configurations, such as for example, a plate, a cylindrical drum, a scroll, an endless flexible belt, and the like. In embodiments, the substrate is in the form of a seamless flexible belt. In some situations, it may be desirable to coat on the back of the substrate, particularly when the substrate is a flexible organic polymeric material, an anticurl layer, such as for example, polycarbonate materials commercially available as MAKROLON®.

The photogenerating layer in embodiments is comprised of a number of known photogenerating pigments, such as for example, about 50 weight percent of Type V hydroxygallium phthalocyanine or chlorogallium phthalocyanine, and about 50 weight percent of a resin binder like poly(vinyl chloride-co-vinyl acetate) copolymer, such as VMCH (available from Dow Chemical). Generally, the photogenerating layer can contain known photogenerating pigments, such as metal phthalocyanines, metal free phthalocyanines, alkylhydroxyl gallium phthalocyanines, hydroxygallium phthalocyanines, chlorogallium phthalocyanines, perylenes, especially bis(benzimidazo)perylene, titanyl phthalocyanines, and the like, and more specifically, vanadyl phthalocyanines, Type V hydroxygallium phthalocyanines, and inorganic components, such as selenium, selenium alloys, and trigonal selenium. The photogenerating pigment can be dispersed in a resin binder similar to the resin binders selected for the charge transport layer, or alternatively no resin binder need be present. Generally, the thickness of the photogenerating layer depends on a number of factors, including the thicknesses of the other layers, and the amount of photogenerating material contained in the photogenerating layer. Accordingly, this layer can be of a thickness of, for example, from about 0.05 micron to about 10 microns, and more specifically, from about 0.25 micron to about 2 microns when, for example, the photogenerating compositions are present in an amount of from about 30 to about 75 percent by volume. The maximum thickness of this layer in embodiments is dependent primarily upon factors, such as photosensitivity, electrical properties, and mechanical considerations. The photogenerating layer binder resin is present in various suitable amounts, for example from about 1 to about 50 weight percent, and more specifically, from about 1 to about 10 weight percent, and which resin may be selected from a number of known polymers, such as poly(vinyl butyral), poly(vinyl carbazole), polyesters, polycarbonates, poly(vinyl chloride), polyacrylates and methacrylates, copolymers of vinyl chloride and vinyl acetate, phenolic resins, polyurethanes, poly(vinyl alcohol), polyacrylonitrile, polystyrene, and the like. It is desirable to select a coating solvent that does not substantially disturb or adversely affect the other previously coated layers of the device. Examples of coating solvents for the photogenerating layer are ketones, alcohols, aromatic hydrocarbons, halogenated aliphatic hydrocarbons, silanols, amines, amides, esters, and the like. Specific solvent examples are cyclohexanone, acetone, methyl ethyl ketone, methanol, ethanol, butanol, amyl alcohol, toluene, xylene, chlorobenzene, carbon tetrachloride, chloroform, methylene chloride, trichloroethylene, tetrahydrofuran, dioxane, diethyl ether, dimethyl formamide, dimethyl acetamide, butyl acetate, ethyl acetate, methoxyethyl acetate, and the like.

The photogenerating layer may comprise amorphous films of selenium and alloys of selenium and arsenic, tellurium, germanium, and the like; hydrogenated amorphous silicon; and compounds of silicon and germanium, carbon, oxygen, nitrogen, and the like fabricated by vacuum evaporation or deposition. The photogenerating layers may also comprise inorganic pigments of crystalline selenium and its alloys; Groups II to VI compounds; and organic pigments, such as quinacridones, polycyclic pigments, such as dibromo anthanthrone pigments, perylene and perinone diamines, polynuclear aromatic quinones, azo pigments including bis-, tris- and tetrakis-azos; and the like dispersed in a film forming polymeric binder, and fabricated by solvent coating techniques.

Infrared sensitivity can be desired for photoconductors illustrated herein when exposed to low cost semiconductor laser diode light exposure devices where, for example, the absorption spectrum and photosensitivity of the phthalocyanines selected depend on the central metal atom thereof. Examples include oxyvanadium phthalocyanine, chloroaluminum phthalocyanine, copper phthalocyanine, oxytitanium phthalocyanine, chlorogallium phthalocyanine, hydroxygallium phthalocyanine, magnesium phthalocyanine, and metal free phthalocyanine. The phthalocyanines exist in many crystal forms, and have a strong influence on photogeneration.

In embodiments, examples of polymeric binder materials that can be selected as the matrix for the photogenerating layer are illustrated in U.S. Pat. No. 3,121,006, the disclosure of which is totally incorporated herein by reference. Examples of binders are thermoplastic and thermosetting resins, such as polycarbonates, polyesters, polyamides, polyurethanes, polystyrenes, polyarylsilanols, polyarylsulfones, polybutadienes, polysulfones, polysilanolsulfones, polyethylenes, polypropylenes, polyimides, polymethylpentenes, poly(phenylene sulfides), poly(vinyl acetate), polysiloxanes, polyacrylates, polyvinyl acetals, polyamides, polyimides, amino resins, phenylene oxide resins, terephthalic acid resins, phenoxy resins, epoxy resins, phenolic resins, polystyrene and acrylonitrile copolymers, poly(vinyl chloride), vinyl chloride and vinyl acetate copolymers, acrylate copolymers, alkyd resins, cellulosic film formers, poly(amideimide), styrene butadiene copolymers, vinylidene chloride-vinyl chloride copolymers, vinyl acetate-vinylidene chloride copolymers, styrene-alkyd resins, poly(vinyl carbazole), and the like. These polymers may be block, random or alternating copolymers.

The photogenerating composition or pigment is present in the resinous binder composition in various amounts. Generally, however, from about 5 percent by weight to about 90 percent by weight of the photogenerating pigment is dispersed in about 10 percent by weight to about 95 percent by weight of the resinous binder, or from about 20 percent by weight to about 50 percent by weight of the photogenerating pigment is dispersed in about 80 percent by weight to about 50 percent by weight of the resinous binder composition. In one embodiment, about 50 percent by weight of the photogenerating pigment is dispersed in about 50 percent by weight of the resinous binder composition.

Various suitable and conventional known processes may be used to mix, and thereafter apply the photogenerating layer coating mixture like spraying, dip coating, roll coating, wire wound rod coating, vacuum sublimation, and the like. For some applications, the photogenerating layer may be fabricated in a dot or line pattern. Removal of the solvent of a solvent-coated layer may be effected by any known conventional techniques such as oven drying, infrared radiation drying, air drying, and the like.

The coating of the photogenerating layer in embodiments of the present disclosure can be accomplished with spray, dip or wire-bar methods such that the final dry thickness of the photogenerating layer is as illustrated herein, and can be, for example, from about 0.01 to about 30 microns after being dried at, for example, about 40° C. to about 150° C. for about 15 to about 90 minutes. More specifically, a photogenerating layer of a thickness, for example, of from about 0.1 to about 30 microns, or from about 0.5 to about 2 microns can be applied to or deposited on the substrate, on other surfaces in between the substrate and the charge transport layer, and the like. A charge blocking layer or hole blocking layer may optionally be applied to the electrically conductive surface prior to the application of a photogenerating layer. An adhesive layer may be included between, for example, the charge blocking or hole blocking layer or interfacial layer, and the photogenerating layer. Usually, the photogenerating layer is applied onto the blocking layer, and a charge transport layer or plurality of charge transport layers are formed on the photogenerating layer.

In embodiments, a suitable known adhesive layer can be included in the photoconductor. Typical adhesive layer materials include, for example, polyesters, polyurethanes, and the like. The adhesive layer thickness can vary and in embodiments is, for example, from about 0.05 micron (500 Angstroms) to about 0.3 micron (3,000 Angstroms). The adhesive layer can be deposited on the hole blocking layer by spraying, dip coating, roll coating, wire wound rod coating, gravure coating, Bird applicator coating, and the like. Drying of the deposited coating may be effected by, for example, oven drying, infrared radiation drying, air drying, and the like.

As adhesive layers usually in contact with or situated between the hole blocking layer and the photogenerating layer, there can be selected various known substances inclusive of copolyesters, polyamides, poly(vinyl butyral), poly (vinyl alcohol), polyurethane, and polyacrylonitrile. This layer is, for example, of a thickness of from about 0.001 micron to about 1 micron, or from about 0.1 micron to about 0.5 micron. Optionally, this layer may contain effective suitable amounts, for example from about 1 to about 10 weight percent, of conductive and nonconductive particles, such as zinc oxide, titanium dioxide, silicon nitride, carbon black, and the like, to provide, for example, in embodiments of the present disclosure further desirable electrical and optical properties.

The optional hole blocking or undercoat layers for the imaging members of the present disclosure can contain a number of components including known hole blocking components, such as amino silanes, doped metal oxides, TiSi, a metal oxide like titanium, chromium, zinc, tin, and the like; a mixture of phenolic compounds and a phenolic resin, or a mixture of two phenolic resins, and optionally a dopant such as $SiO_2$. The phenolic compounds usually contain at least two phenol groups, such as bisphenol A (4,4'-isopropylidenediphenol), E (4,4'-ethylidenebisphenol), F (bis(4-hydroxyphenyl)methane), M (4,4'-(1,3-phenylenediisopropylidene) bisphenol), P (4,4'-(1,4-phenylene diisopropylidene) bisphenol), S (4,4'-sulfonyldiphenol), and Z (4,4'-cyclohexylidenebisphenol); hexafluorobisphenol A (4,4'-(hexafluoro isopropylidene) diphenol), resorcinol, hydroxyquinone, catechin, and the like.

The hole blocking layer can be, for example, comprised of from about 20 weight percent to about 80 weight percent, and more specifically, from about 55 weight percent to about 65 weight percent of a suitable component like a metal oxide, such as $TiO_2$; from about 20 weight percent to about 70 weight percent, and more specifically, from about 25 weight percent to about 50 weight percent of a phenolic resin; from about 2 weight percent to about 20 weight percent, and more specifically, from about 5 weight percent to about 15 weight percent of a phenolic compound preferably containing at least two phenolic groups, such as bisphenol S; and from about 2 weight percent to about 15 weight percent, and more specifically, from about 4 weight percent to about 10 weight percent of a plywood suppression dopant, such as $SiO_2$. The hole blocking layer coating dispersion can, for example, be prepared as follows. The metal oxide/phenolic resin dispersion is first prepared by ball milling or dynomilling until the median particle size of the metal oxide in the dispersion is less than about 10 nanometers, for example from about 5 to about 9 nanometers. To the above dispersion are added a phenolic compound and dopant followed by mixing. The hole blocking layer coating dispersion can be applied by dip coating or web coating, and the layer can be thermally cured after coating. The hole blocking layer resulting is, for example, of a thickness of from about 0.01 micron to about 30 microns, and more specifically, from about 0.1 micron to about 8 microns. Examples of phenolic resins include formaldehyde polymers with phenol, p-tert-butylphenol, cresol, such as VARCUM® 29159 and 29101 (available from OxyChem Company), and DURITE® 97 (available from Borden Chemical); formaldehyde polymers with ammonia, cresol and phenol, such as VARCUM® 29112 (available from OxyChem Company); formaldehyde polymers with 4,4'-(1-methylethylidene) bisphenol, such as VARCUM® 29108 and 29116 (available from OxyChem Company); formaldehyde polymers with cresol and phenol, such as VARCUM® 29457 (available from OxyChem Company), DURITE® SD-423A, SD-422A (available from Borden Chemical); or formaldehyde polymers with phenol and p-tert-butylphenol, such as DURITE® ESD 556C (available from Borden Chemical).

The hole blocking layer may be applied to the substrate. Any suitable and conventional blocking layer capable of forming an electronic barrier to holes between the adjacent photoconductive layer (or electrophotographic imaging layer) and the underlying conductive surface of substrate may be selected.

The charge transport layer, which layer is generally of a thickness of from about 5 microns to about 75 microns, and more specifically, of a thickness of from about 10 microns to about 40 microns, components, and molecules include a number of known materials, such as aryl amines represented by

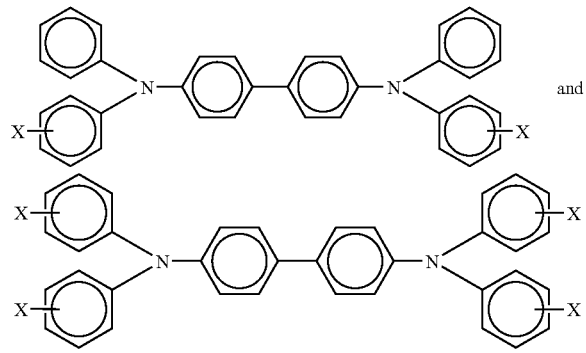

wherein X is alkyl, alkoxy, aryl, a halogen, or mixtures thereof, or wherein each X can also be present on each of the four terminating rings, and especially those substituents selected from the group consisting of Cl and $CH_3$; and molecules as represented by

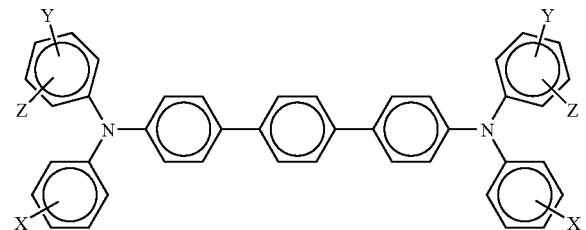

wherein at least one of X, Y and Z are independently alkyl, alkoxy, aryl, a halogen, or mixtures thereof, and wherein either Y, Z, or both Y and Z can be present;

Alkyl and alkoxy contain, for example, from 1 to about 25 carbon atoms, and more specifically, from 1 to about 12 carbon atoms, such as methyl, ethyl, propyl, butyl, pentyl, and the corresponding alkoxides. Aryl can contain from 6 to about 36 carbon atoms, such as phenyl, and the like. Halogen includes chloride, bromide, iodide, and fluoride. Substituted alkyls, alkoxys, and aryls can also be selected in embodiments.

Examples of specific aryl amines include N,N'-diphenyl-N,N'-bis(alkylphenyl)-1,1-biphenyl-4,4'-diamine wherein alkyl is selected from the group consisting of methyl, ethyl, propyl, butyl, hexyl, and the like; N,N'-diphenyl-N,N'-bis(halophenyl)-1,1'-biphenyl-4,4'-diamine wherein the halo substituent is a chloro substituent; N,N'-bis(4-butylphenyl)-N,N'-di-p-tolyl-[p-terphenyl]-4,4"-diamine, N,N'-bis(4-butylphenyl)-N,N'-di-m-tolyl-[p-terphenyl]-4,4"-diamine, N,N'-bis(4-butylphenyl)-N,N'-di-o-tolyl-[p-terphenyl]-4,4"-diamine, N,N'-bis(4-butylphenyl)-N,N'-bis-(4-isopropylphenyl)-[p-terphenyl]-4,4"-diamine, N,N'-bis(4-butylphenyl)-N,N'-bis-(2-ethyl-6-methylphenyl)-[p-terphenyl]-4,4"-diamine, N,N'-bis(4-butylphenyl)-N,N'-bis-(2,5-dimethylphenyl)-[p-terphenyl]-4,4'-diamine, N,N'-diphenyl-N,N'-bis(3-chlorophenyl)-[p-terphenyl]-4,4"-diamine, and the like. Other known charge transport layer molecules can be selected, reference for example, U.S. Pat. Nos. 4,921,773 and 4,464,450, the disclosures of which are totally incorporated herein by reference.

The charge transport layer components illustrated herein can also be selected as the charge transport compound for the photoconductor top overcoating layer.

Examples of the binder materials selected for the photogenerating layer and charge transport layer include components, such as those described in U.S. Pat. No. 3,121,006, the disclosure of which is totally incorporated herein by reference. Specific examples of polymer binder materials include polycarbonates, polyarylates, acrylate polymers, vinyl polymers, cellulose polymers, polyesters, polysiloxanes, polyamides, polyurethanes, poly(cyclo olefins), epoxies, and random or alternating copolymers thereof; and more specifically, polycarbonates such as poly(4,4'-isopropylidene-diphenylene) carbonate (also referred to as bisphenol-A-polycarbonate), poly(4,4'-cyclohexylidinediphenylene)carbonate (also referred to as bisphenol-Z-polycarbonate), poly(4,4'-isopropylidene-3,3'-dimethyl-diphenyl)carbonate (also referred to as bisphenol-C-polycarbonate), and the like. In embodiments, electrically inactive binders are comprised of polycarbonate resins with, for example, a weight average molecular weight of from about 20,000 to about 100,000, and more specifically with a weight average molecular weight $M_w$ of from about 50,000 to about 100,000. Generally, the transport layer contains from about 10 to about 75 percent by weight of the charge transport material, and more specifically, from about 35 percent to about 50 percent of this material.

The charge transport layer or layers, and more specifically, a first charge transport in contact with the photogenerating layer, and thereover a top or second charge transport layer may comprise charge transporting small molecules dissolved or molecularly dispersed in a film forming electrically inert polymer such as a polycarbonate. In embodiments, "dissolved" refers, for example, to forming a solution in which the small molecule and silanol are dissolved in the polymer to form a homogeneous phase; and "molecularly dispersed in embodiments" refers, for example, to charge transporting molecules dispersed in the polymer, the small molecules being dispersed in the polymer on a molecular scale. Various charge transporting or electrically active small molecules may be selected for the charge transport layer or layers. In embodiments, charge transport refers, for example, to charge transporting molecules as a monomer that allows the free charge generated in the photogenerating layer to be transported across the transport layer.

Examples of charge transporting molecules present in the charge transport layer in an amount of, for example, from about 20 to about 65 weight percent, include, for example, pyrazolines such as 1-phenyl-3-(4'-diethylamino styryl)-5-(4"-diethylamino phenyl)pyrazoline; aryl amines such as N,N'-diphenyl-N,N'-bis(3-methylphenyl)-(1,1'-biphenyl)-4,4'-diamine, N,N'-bis(4-butylphenyl)-N,N'-di-p-tolyl-[p-terphenyl]-4,4"-diamine, N,N'-bis(4-butylphenyl)-N,N'-di-m-tolyl-[p-terphenyl]-4,4"-diamine, N,N'-bis(4-butylphenyl)-N,N'-di-o-tolyl-[p-terphenyl]-4,4"-diamine, N,N'-bis(4-butylphenyl)-N,N'-bis-(4-isopropylphenyl)-[p-terphenyl]-4,4"-diamine, N,N'-bis(4-butylphenyl)-N,N'-bis-(2-ethyl-6-methylphenyl)-[p-terphenyl]-4,4"-diamine, N,N'-bis(4-butylphenyl)-N,N'-bis-(2,5-dimethylphenyl)-[p-terphenyl]-4,4"-diamine, N,N'-diphenyl-N,N'-bis(3-chlorophenyl)-[p-terphenyl]-4,4"-diamine; hydrazones such as N-phenyl-N-methyl-3-(9-ethyl)carbazyl hydrazone, and 4-diethyl amino benzaldehyde-1,2-diphenyl hydrazone; and oxadiazoles, such as 2,5-bis(4-N,N'-diethylaminophenyl)-1,2,4-oxadiazole, stilbenes, and the like. However, in embodiments to minimize or avoid cycle-up in equipment, such as printers, with high throughput, the charge transport layer should be substantially free (less than about two percent) of di or triaminotriphenyl methane. A small molecule charge transporting compound that permits injection of holes into the photogenerating layer with high efficiency, and transports them across the charge transport layer with short transit times includes N,N'-diphenyl-N,N'-bis(3-methylphenyl)-(1,1'-biphenyl)-4,4'-diamine, N,N'-bis(4-butylphenyl)-N,N'-di-p-tolyl-[p-terphenyl]-4,4"-diamine, N,N'-bis(4-butylphenyl)-N,N'-di-m-tolyl-[p-terphenyl]-4,4"-diamine, N,N'-bis(4-butylphenyl)-N,N'-di-o-tolyl-[p-terphenyl]-4,4"-diamine, N,N'-bis(4-butylphenyl)-N,N'-bis-(4-isopropylphenyl)-[p-terphenyl]-4,4"-diamine, N,N'-bis(4-butylphenyl)-N,N'-bis-(2-ethyl-6-methylphenyl)-[p-terphenyl]-4,4"-diamine, N,N'-bis(4-butylphenyl)-N,N'-bis-(2,5-dimethylphenyl)-[p-terphenyl]-4,4"-diamine, and N,N'-diphenyl-N,N'-bis(3-chlorophenyl)-[p-terphenyl]-4,4"-diamine, or mixtures thereof. If desired, the charge transport material in the charge transport layer may comprise a polymeric charge transport material, or a combination of a small molecule charge transport material and a polymeric charge transport material.

A number of processes may be used to mix, and thereafter apply the charge transport layer or layers coating mixture to the photogenerating layer. Typical application techniques include spraying, dip coating, roll coating, wire wound rod coating, and the like. Drying of the charge transport deposited coating may be effected by any suitable conventional technique such as oven drying, infrared radiation drying, air drying, and the like.

The thickness of each of the charge transport layers in embodiments is from about 5 to about 75 microns, but thicknesses outside this range may, in embodiments, also be selected. The charge transport layer should be an insulator to the extent that an electrostatic charge placed on the hole transport layer is not conducted in the absence of illumination at a rate sufficient to prevent formation and retention of an electrostatic latent image thereon. In general, the ratio of the thickness of the charge transport layer to the photogenerating layer can be from about 2:1 to 200:1, and in some instances 400:1. The charge transport layer is substantially nonabsorbing to visible light or radiation in the region of intended use, but is electrically "active" in that it allows the injection of photogenerated holes from the photoconductive layer, or photogenerating layer, and allows these holes to be transported through itself to selectively discharge a surface charge on the surface of the active layer.

The thickness of the continuous charge transport overcoat layer selected depends upon the abrasiveness of the charging (bias charging roll), cleaning (blade or web), development (brush), transfer (bias transfer roll), and the like in the system employed, and this thickness can be up to about 10 microns. In embodiments, this thickness for each layer is from about 1 micron to about 5 microns. Various suitable and conventional methods may be used to mix, and thereafter apply the overcoat layer coating mixture to the charge transport layer. Typical application techniques include spraying, dip coating, roll coating, wire wound rod coating, and the like. Drying of the deposited coating may be effected by any suitable conventional technique, such as oven drying, infrared radiation drying, air drying, and the like. The dried overcoating layer of this disclosure should transport holes during imaging and should not have too high a free carrier concentration.

The top charge transport layer can comprise the same components as the charge transport layer wherein the weight ratio between the charge transporting small molecules, and the suitable electrically inactive resin binder is less, such as for example, from about 0/100 to about 60/40, or from about 20/80 to about 40/60.

The photoconductors disclosed herein include a protective overcoating layer (POC) usually in contact with and contiguous to the charge transport layer. This POC layer in embodiments is comprised of components that include (i) an alkyl alcohol, (ii) a glycol monoether, (iii) a branched polyester polyol or an acrylated polyol, (iv) a linear polyester polyol or an alkylene glycol polymer, such as polypropylene glycol where the proportion of the branched polyester polyol or the acrylated polyol to the linear polyester polyol or the polypropylene glycol is, for example, from about 0.1:0.9 to about 0.9:0.1, (v) at least one transport compound, and (vi) at least one crosslinking agent. The overcoat composition can comprise as a first polymer a branched polyester polyol or an acrylated polyol with a hydroxyl number of, for example, from about 10 to about 20,000; a second polymer of a linear polyester polyol or an alkylene glycol excluding mixtures thereof in embodiments, each with, for example, a weight average molecular weight of from about 100 to about 20,000, from about 400 to about 5,000, or from about 1,000 to about 2,000, a charge transport compound, an acid catalyst, and a crosslinking agent wherein the overcoating layer, which is crosslinked, contains a polyol, such as a polyester such as a polyol polyester or an acrylated polyol, and optionally a glycol, a crosslinking agent residue and a catalyst residue, all reacted into a polymeric network. The percentage of crosslinking can be difficult to determine, however, while not being desired to be limited by theory, the overcoat layer is crosslinked to a suitable value, such as for example, from about 5 to about 50 percent, from about 5 to about 25 percent, from about 10 to about 20 percent, and in embodiments from about 40 to about 65 percent. Excellent photoconductor electrical response can also be achieved when the prepolymer hydroxyl groups, and the hydroxyl groups of the dihydroxy aryl amine (DHTPD) are stoiciometrically less than the available methoxy alkyl on the crosslinking, such as CYMEL® moieties.

The overcoat layer can contain an alcohol soluble charge transport material, such as N,N'-diphenyl-N,N'-bis(3-hydroxyphenyl)-[1,1'-biphenyl]-4,4'-diamine [DHTPD] represented by

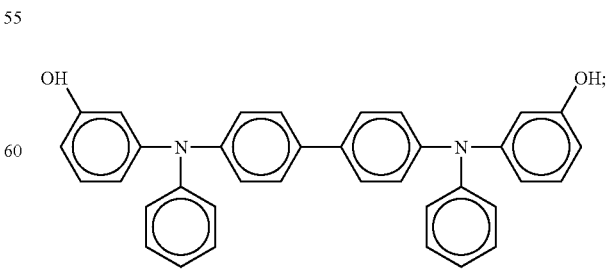

or dihydroxyterphenyl arylamines as represented by

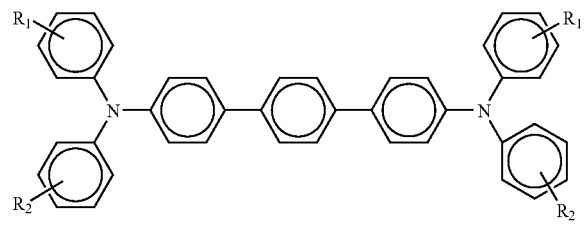

where each $R_1$ and $R_2$ is independently selected from the group consisting of at least one of —H, —OH, —$C_nH_{2n+1}$ where n is from 1 to about 12; aralkyl, and aryl groups, the aralkyl and aryl groups having, for example, from about 6 to about 36 carbon atoms. The dihydroxy arylamine compounds can be free of any direct conjugation between the —OH groups and the nearest nitrogen atom through one or more aromatic rings. The expression "direct conjugation" refers, for example, to the presence of a segment having the formula —(C═C)$_n$—C═C— in one or more aromatic rings directly between an —OH group and the nearest nitrogen atom. Examples of direct conjugation between the —OH groups and the nearest nitrogen atom through one or more aromatic rings include a compound containing a phenylene group having an —OH group in the ortho or para position (or 2 or 4 position) on the phenylene group relative to a nitrogen atom attached to the phenylene group or a compound containing a polyphenylene group having an —OH group in the ortho or para position on the terminal phenylene group relative to a nitrogen atom attached to an associated phenylene group. Examples of aralkyl groups include, for example, —$C_nH_{2n}$-phenyl groups where n is from about 1 to about 5, or from about 1 to about 10; examples of aryl groups include, for example, phenyl, naphthyl, biphenyl, and the like. In embodiments, when $R_1$ is —OH and each $R_2$ is n-butyl, the resultant compound is N,N'-bis[4-n-butylphenyl]-N,N'-di[3-hydroxyphenyl]-terphenyl-diamine. Another alcohol soluble charge transport material that can typically be used in forming the overcoat layer is a charge transport material represented by the general formula Q—[L—OH]$_n$ wherein Q represents a charge transport component, L represents a divalent group, O represents oxygen, and n represents a number of repeating segments or groups, such as, for example, a dihydroxymethyl-triphenylamine (DHM-TPA) like 4,4'-(3,4-dimethylphenylazanediyl)bis(4,1-phenylene) dimethanol, and the like as described, for example, in U.S. patent application Ser. No. 11/275,546, filed Jan. 13, 2006 on Photoreceptor With Overcoat Layer, the disclosure of which is totally incorporated herein by reference. Also, in embodiments, the hole transport material is substantially soluble, for example from about 90 to about 99 percent in the solvent selected for the formation of the overcoat layer.

The photoconductor overcoat can be applied by a number of different processes inclusive of dispersing the overcoat composition in a solvent system, and applying the resulting overcoat coating solution onto the receiving surface, for example, the top charge transport layer of the photoreceptor to a thickness of, for example, from about 0.5 micron to about 10, or from 0.5 to about 8 microns.

According to various embodiments, the crosslinkable polymer present in the overcoating layer prior to evaporation of, for example, volatiles like the solvent selected, can comprise a mixture of a polyol and an acrylated polyol film forming resin, and where, for example, the crosslinkable polymer can be electrically insulating, semiconductive or conductive, and can be charge transporting or free of charge transporting characteristics. Examples of polyols include a highly branched polyol where highly branched refers, for example, to a prepolymer synthesized using a sufficient amount of trifunctional alcohols, such as triols, or a polyfunctional polyol with a high hydroxyl number to form a polymer comprising a number of branches off of the main polymer chain. The polyol can possess a hydroxyl number of, for example, from about 10 to about 10,000, and can include ether groups, or can be free of ether groups. Suitable acrylated polyols can be, for example, generated from the reaction products of propylene oxide modified with ethylene oxide, glycols, triglycerol and the like, and wherein the acrylated polyols can be represented by the following formula

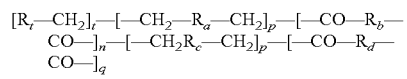

where $R_t$ represents $CH_2CR_1CO_2$—; $R_1$ is alkyl with, for example, from 1 to about 25 carbon atoms, and more specifically, from 1 to about 12 carbon atoms, such as methyl, ethyl, propyl, butyl, hexyl, heptyl, and the like; $R_a$ and $R_c$ independently represent linear alkyl groups, alkoxy groups, branched alkyl or branched alkoxy groups with alkyl and alkoxy groups possessing, for example, from 1 to about 20 carbon atoms; $R_b$ and $R_d$ independently represent alkyl or alkoxy groups having, for example, from 1 to about 20 carbon atoms; and m, n, p, and q represent mole fractions of from 0 to 1, such that n+m+p+q is equal to 1. Examples of commercial acrylated polyols are JONCRYL™ polymers, available from Johnson Polymers Inc., and POLYCHEM™ polymers, available from OPC polymers.

The overcoat layer includes in embodiments a crosslinking agent and catalyst where the crosslinking agent can be, for example, a melamine crosslinking agent or accelerator. Incorporation of a crosslinking agent can provide reaction sites to interact with the acrylated polyol to provide a branched, crosslinked structure. When so incorporated, any suitable crosslinking agent or accelerator can be used, including, for example, trioxane, melamine compounds, and mixtures thereof. When melamine compounds are selected, they can be functionalized, examples of which are melamine formaldehyde, methoxymethylated melamine compounds, such as glycouril-formaldehyde and benzoguanamine-formaldehyde, and the like. In embodiments, the crosslinking agent can include a methylated, butylated melamine-formaldehyde. A nonlimiting example of a suitable methoxymethylated melamine compound is CYMEL® 303 (available from Cytec Industries), which is a methoxymethylated melamine compound with the formula $(CH_3OCH_2)_6N_3C_3N_3$, and as represented by

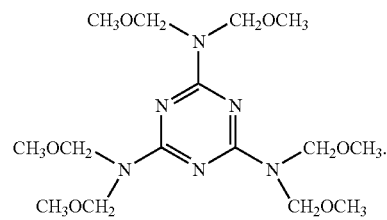

Crosslinking can be accomplished by heating the overcoating components in the presence of a catalyst. Non-limiting examples of catalysts include oxalic acid, maleic acid, carbolic acid, ascorbic acid, malonic acid, succinic acid, tartaric acid, citric acid, p-toluenesulfonic acid, methanesulfonic acid, and the like, and mixtures thereof.

A blocking agent selected in various suitable amounts, and which agent can be part of the amount of the catalyst weight since the blocking agent and catalyst can in embodiments be prereacted, which agent can "tie up" or substantially block the acid catalyst effect to provide solution stability until the acid catalyst function is desired. Thus, for example, the blocking agent can block the acid effect until the solution temperature is raised above a threshold temperature. For example, some blocking agents can be used to block the acid effect until the solution temperature is raised above about 100° C. At that time, the blocking agent dissociates from the acid and vaporizes. The unassociated acid is then free to catalyze the polymerization. Examples of such suitable blocking agents include, but are not limited to, pyridine and commercial acid solutions containing blocking agents, such as CYCAT® 4045, available from Cytec Industries Inc.

The temperature used for crosslinking varies with the specific catalyst, the catalyst amount, heating time utilized, and the degree of crosslinking desired. Generally, the degree of crosslinking selected depends upon the desired flexibility of the final photoreceptor. For example, complete crosslinking, that is 100 percent, may be used for rigid drum or plate photoreceptors. However, partial crosslinking, for example from about 20 percent to about 80 percent, is usually selected for flexible photoreceptors having, for example, web or belt configurations. The amount of catalyst to achieve a desired degree of crosslinking will vary depending upon the specific coating solution materials, such as polyester polyol/acrylated polyol, catalyst, temperature, and time used for the reaction. Specifically, the polyester polyol/acrylated polyol is crosslinked at a temperature between about 100° C. and about 150° C. (between includes all values from about to about). A typical crosslinking temperature used for polyols/acrylated polyols with p-toluenesulfonic acid as a catalyst is less than about 140° C., for example 135° C., for about 1 minute to about 40 minutes. A typical concentration of acid catalyst is from about 0.01 to about 5 weight percent based on the weight of polyol/acrylated polyol. After crosslinking, the overcoating should be substantially insoluble in the solvent in which it was soluble prior to crosslinking, thus permitting no overcoating material to be removed when rubbed with a cloth soaked in the solvent. Crosslinking results in the development of a three dimensional network which restrains the transport molecule in the crosslinked polymer network.

The overcoat layer can also include a charge transport material as illustrated herein to, for example, improve the charge transport mobility of the overcoat layer. According to various embodiments, the charge transport material can be selected from the group consisting of at least one of (i) a phenolic substituted aromatic amine, (ii) a primary alcohol substituted aromatic amine, and (iii) mixtures thereof. In embodiments, the charge transport material can be a terphenyl of, for example, an alcohol soluble dihydroxy terphenyl diamine; an alcohol soluble dihydroxy TPD, and the like. An example of a terphenyl charge transporting molecule can be represented by the following formula

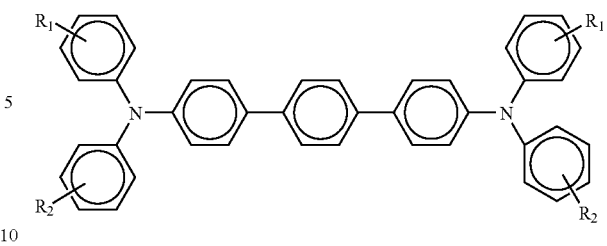

where each $R_1$ is —OH; $R_2$ is alkyl (—$C_nH_{2n+1}$) where, for example, n is from 1 to about 10, from 1 to about 5, or from about 1 to about 6; and aralkyl and aryl groups with, for example, from about 6 to about 30, and more specifically, from about 6 to about 20 carbon atoms. Examples of aralkyl groups include, for example, —$C_nH_{2n}$-phenyl groups where n is, for example, from about 1 to about 5 or from about 1 to about 10. Suitable examples of aryl groups include, for example, phenyl, naphthyl, biphenyl, and the like. In one embodiment, each $R_1$ is —OH to provide a dihydroxy terphenyl diamine hole transporting molecule. For example, where each $R_1$ is —OH, and each $R_2$ is —H, the resultant compound is N,N'-diphenyl-N,N'-di[3-hydroxyphenyl]-terphenyl-diamine. In another embodiment, each $R_1$ is —OH, and each $R_2$ is independently an alkyl, aralkyl, or aryl group as defined above. In various embodiments, the charge transport material is soluble in the selected solvent used in forming the overcoat layer.

The thickness of the overcoat layer, which can depend upon the abrasiveness of the charging (for example bias charging roll), cleaning (for example blade or web), development (for example brush), transfer (for example bias transfer roll) in the system or printing apparatus employed is, for example, from about 1 or about 2 microns up to about 10 or about 15 microns, or more. In various embodiments, the thickness of the overcoat layer can be from about 1 micron to about 5 microns. Typical application techniques for applying the overcoat layer over the photoconductive layer can include spraying, dip coating, roll coating, wire wound rod coating, and the like. Drying of the deposited overcoat layer can be effected by any suitable conventional technique, such as oven drying, infrared radiation drying, air drying, and the like. The dried overcoat layer of this disclosure should transport charges during imaging.

In the dried overcoat layer, the composition can include from about 40 to about 90 percent by weight of a film forming crosslinkable polymer, and from about 60 to about 10 percent by weight of the charge transport material. For example, in embodiments, the charge transport material can be incorporated into the overcoat layer in an amount of from about 20 to about 50 percent by weight. As desired, the overcoat layer can also include other materials, such as conductive fillers, such as ZnO nanoparticles, abrasion resistant fillers, such as alumina nanoparticles, and the like, in any suitable and known amounts such as, for example, from about 0.5 to about 5 weight percent. Although not being desired to be limited by theory, the crosslinking agent can be located in the central region with the polymers like the acrylated polyol, polyalkylene glycol, and also charge transport component being associated with the crosslinking agent, and extending in embodiments from the central region.

Examples of components or materials optionally incorporated into the charge transport layers or at least one charge transport layer to, for example, enable improved lateral charge migration (LCM) resistance include hindered phenolic antioxidants, such as tetrakis methylene(3,5-di-tert-butyl-4-hydroxy hydrocinnamate) methane (IRGANOX® 1010, available from Ciba Specialty Chemical), butylated hydroxytoluene (BHT), and other hindered phenolic antioxidants including SUMILIZER™ BHT-R, MDP-S, BBM-S, WX-R, NR, BP-76, BP-101, GA-80, GM and GS (available from Sumitomo Chemical Company, Ltd.), IRGANOX® 1035, 1076, 1098, 1135, 1141, 1222, 1330, 1425WL, 1520L, 245, 259, 3114, 3790, 5057 and 565 (available from Ciba Specialties Chemicals), and ADEKA STAB™ AO-20, AO-30, AO-40, AO-50, AO-60, AO-70, AO-80 and AO-330 (available from Asahi Denka Company, Ltd.); hindered amine antioxidants such as SANOL™ LS-2626, LS-765, LS-770 and LS-744 (available from SANKYO CO., Ltd.), TINUVIN® 144 and 622LD (available from Ciba Specialties Chemicals), MARK™ LA57, LA67, LA62, LA68 and LA63 (available from Asahi Denka Co., Ltd.), and SUMILIZER™ TPS (available from Sumitomo Chemical Co., Ltd.); thioether antioxidants such as SUMILIZER™ TP-D (available from Sumitomo Chemical Co., Ltd); phosphite antioxidants such as MARK™ 2112, PEP-8, PEP-24G, PEP-36, 329K and HP-10 (available from Asahi Denka Co., Ltd.); other molecules, such as bis(4-diethylamino-2-methylphenyl)phenylmethane (BDETPM), bis-[2-methyl-4-(N-2-hydroxyethyl-N-ethyl-aminophenyl)]-phenylmethane (DHTPM), and the like. The weight percent of the antioxidant in at least one of the charge transport layers is from about 0 to about 20, from about 1 to about 10, or from about 3 to about 8 weight percent.

At least one charge transport layer refers, for example, to a single layer or a plurality of layers, such as from 1 to about 10 layers or more in certain situations, and more specifically, from 1 to about 4 layers, and yet more specifically, 2 layers.

Primarily for purposes of brevity, the examples of each of the substituents, and each of the components/compounds/molecules, polymers (components) for each of the layers specifically disclosed herein are not intended to be exhaustive. Thus, a number of components, polymers, formulas, structures, and R group or substituent examples, and carbon chain lengths not specifically disclosed or claimed are intended to be encompassed by the present disclosure and claims. Also, the carbon chain lengths are intended to include all numbers between those disclosed or claimed or envisioned, thus from 1 to about 20 carbon atoms, and from 6 to about 36 carbon atoms includes 1, 2, 3, 4, 5, 6, 7, 8, 9, 10, 11, 12, 13, 14, 15, up to 36, or more. Similarly, the thickness of each of the layers, the examples of components in each of the layers, the amount ranges of each of the components disclosed and claimed are not exhaustive, and it is intended that the present disclosure and claims encompass other suitable parameters not disclosed or that may be envisioned.

The following Examples are provided.

Comparative Example 1

A photoconductor was prepared by providing a 0.02 micron thick titanium layer coated (the coater device) on a biaxially oriented polyethylene naphthalate substrate (KALEDEX™ 2000) having a thickness of 3.5 mils, and applying thereon with a gravure applicator a solution containing 50 grams of 3-amino-propyltriethoxysilane (blocking or undercoat layer), 41.2 grams of water, 15 grams of acetic acid, 684.8 grams of denatured alcohol, and 200 grams of heptane. The resulting layer was then dried for about 5 minutes at 135° C. in the forced air dryer of the coater. The resulting blocking layer had a dry thickness of 500 Angstroms. An adhesive layer was then prepared by applying a wet coating thereof over the blocking layer, using a gravure applicator or by extrusion, and which adhesive contained 0.2 percent by weight based on the total weight of the solution of copolyester adhesive (ARDEL™ D100 available from Toyota Hsutsu Inc.) in a 60:30:10 volume ratio mixture of tetrahydrofuran/monochlorobenzene/methylene chloride. The adhesive layer was then dried for about 5 minutes at 135° C. in the above forced air dryer of the coater. The resulting adhesive layer had a dry thickness of 200 Angstroms.

A photogenerating layer dispersion was prepared by introducing 0.45 gram of the known polycarbonate IUPILON™ 200 (PCZ-200) or Polycarbonate Z™, weight average molecular weight of 20,000, available from Mitsubishi Gas Chemical Corporation, and 50 milliliters of tetrahydrofuran into a 4 ounce glass bottle. To this solution were added 2.4 grams of hydroxygallium phthalocyanine (Type V) and 300 grams of ⅛ inch (3.2 millimeters) diameter stainless steel shot. The resulting mixture was then placed on a ball mill for 8 hours. Subsequently, 2.25 grams of PCZ-200 were dissolved in 46.1 grams of tetrahydrofuran, and added to the hydroxygallium phthalocyanine dispersion. This slurry was then placed on a paint type shaker for 10 minutes. The resulting dispersion was, thereafter, applied to the above adhesive interface with a Bird applicator to form a photogenerating layer having a wet thickness of 0.25 mil. A strip about 10 millimeters wide along one edge of the substrate web bearing the blocking layer and the adhesive layer was deliberately left uncoated by any of the photogenerating layer material to facilitate adequate electrical contact by a known ground strip layer that was applied later in accordance with known processes. The charge generation layer was dried at 135° C. for 5 minutes in a forced air oven to form a dry photogenerating layer having a thickness of 0.4 micron.

The resulting imaging member or photoconductor web was then overcoated with two separate charge transport layers. Specifically, the photogenerating layer was overcoated with a charge transport layer (the bottom layer) in contact with the photogenerating layer. The bottom layer of the charge transport layer was prepared by introducing into an amber glass bottle in a weight ratio of 1:1 N,N'-diphenyl-N,N'-bis(3-methylphenyl)-1,1'-biphenyl-4,4'-diamine, and MAKROLON® 5705, a known polycarbonate resin having a molecular weight average of from about 50,000 to 100,000, commercially available from Farbenfabriken Bayer A.G. The resulting mixture was then dissolved in methylene chloride to form a solution containing 15 percent by weight solids. This solution was applied, using a 2 mil Bird bar, onto the photogenerating layer to form the bottom layer coating that upon drying (120° C. for 1 minute) had a thickness of 14.5 microns. During this coating process, the humidity was equal to or less than 15 percent.

The bottom layer of the charge transport layer (CTL) was then overcoated with a top charge transport layer in a second pass. The charge transport layer solution of the top layer was prepared as described above for the bottom layer. This solution was applied, using a 2 mil Bird bar, on the bottom layer of the charge transport layer to form a coating that upon drying (120° C. for 1 minute) had a thickness of 14.5 microns. During this coating process, the humidity was equal to or less than 15 percent. The total CTL thickness was 29 microns.

An overcoat coating composition solution was then applied to the above top charge transport layer, and which overcoating was formed by adding 10 grams of POLYCHEM® 7558-B-60 (an acrylated polyol obtained from OPC Polymers), 4 grams of PPG 2K (a polypropyleneglycol with a weight average molecular weight of 2,000 as obtained from Sigma-Aldrich), 6 grams of CYMEL® 1130 (a methylated, butylated melamine-formaldehyde crosslinking agent obtained from Cytec Industries Inc.), 8 grams of N,N'-diphenyl-N,N'-di[3-hydroxyphenyl]-terphenyl-diamine (DHTPD), 1.5 grams of SILCLEAN™ 3700 (hydroxy functionalized siloxane modified polyacrylate available from BYK-Chemie USA), and 5.5 grams of 8 percent p-toluenesulfonic acid catalyst in 60 grams of DOWANOL® PM (1-methoxy-2-propanol obtained from the Dow Chemical Company) using a 0.125 mil Bird bar. The resultant overcoating was dried in a forced air oven for 2 minutes at 125° C. to yield a crosslinked 3 micron thick overcoat, and which overcoat was substantially insoluble in methanol or ethanol.

Example II

A photoconductor was prepared by repeating the process of Comparative Example 1 except that the overcoating layer composition used to form the overcoat was formed by adding 10 grams of POLYCHEM® 7558-B-60 (an acrylated polyol obtained from OPC Polymers), 4 grams of PPG 2K (a polypropyleneglycol with a weight average molecular weight of 2,000 as obtained from Sigma-Aldrich), 6 grams of CYMEL® 1130 (a methylated, butylated melamine-formaldehyde crosslinking agent obtained from Cytec Industries Inc.), 8 grams of N,N'-diphenyl-N,N'-di[3-hydroxyphenyl]-terphenyl-diamine (DHTPD), 1.5 grams of SILCLEAN™ 3700 (hydroxy functionalized siloxane modified polyacrylate available from BYK-Chemie USA), and 5.5 grams of 8 percent p-toluenesulfonic acid catalyst in a 60 gram mixture of DOWANOL® PM (1-methoxy-2-propanol), 50 weight percent, and 2-propanol, 50 weight percent.

The resultant dried overcoat after evaporation of the solvent is believed to be comprised of, noting for example, that these percentages could change in that the overcoating components can be partially reacted, about 23 weight percent of POLYCHEM® 7558-B-60 (an acrylated polyol obtained from OPC Polymers), about 16 weight percent of PPG 2K (a polypropyleneglycol with a weight average molecular weight of 2,000 as obtained from Sigma-Aldrich), about 24 weight percent of CYMEL® 1130 (a methylated, butylated melamine-formaldehyde crosslinking agent obtained from Cytec Industries Inc.), about 30 weight percent of N,N'-diphenyl-N,N'-di[3-hydroxyphenyl]-terphenyl-diamine (DHTPD), about 6 weight percent of SILCLEAN™ 3700 (hydroxy functionalized siloxane modified polyacrylate available from BYK-Chemie USA), and about 1 weight percent of p-toluenesulfonic acid catalyst.

Electrical Property Testing

The above prepared photoconductors were tested in a scanner set to obtain photoinduced discharge cycles, sequenced at one charge-erase cycle, followed by one charge-expose-erase cycle wherein the light intensity was incrementally increased with cycling to produce a series of photoinduced discharge characteristic (PIDC) curves from which the photosensitivity and surface potentials at various exposure intensities were measured. Additional electrical characteristics were obtained by a series of charge-erase cycles with incrementing surface potential to generate several voltage versus charge density curves. The scanner was equipped with a scorotron set to a constant voltage charging at various surface potentials. The photoconductors were tested at surface potentials of −500 volts with the exposure light intensity incrementally increased by means of a data acquisition system where the current to the light emitting diode was controlled to obtain different exposure levels. The exposure light source was a 780 nanometer light emitting diode. The xerographic simulation process was completed in an environmentally controlled light tight chamber at ambient conditions (40 percent relative humidity and 22° C.). The photoconductors were also operated for 10,000 imaging cycles electrically with charge-discharge-erase. Photoinduced discharge characteristic (PIDC) curves were generated at both cycle=0 and cycle=10,000. The results, which are summarized in Table 1, evidence that using a mixture of DOWANOL® and another solvent leads to an improvement in coating quality of the photoreceptor layers, as determined from visual inspection which reveals more shiny coatings evidencing better coating quality, and hence potentially better scratch and crack resistance durability without undermining or adversely affecting the electrical performance of the photoconductor, and more specifically, the initial electrical characteristics of the photoconductor or the stability of these characteristics during long term repetitive xerographic imaging cycles.

TABLE 1

| | V (2.6 ergs/cm$^2$) (V) | | |
|---|---|---|---|
| | Cycle = 0 | Cycle = 10,000 | Coating Quality |
| COMPARATIVE EXAMPLE 1 | 104 | 160 | Poor (due to haze) |
| EXAMPLE II | 100 | 158 | Good |

Comparative Example 2

A photoconductor was prepared by repeating the process of Example II except that an overcoating layer was formed from an overcoating solution formed by adding 1.25 grams of POLYCHEM® 7558-B-60 (an acrylated polyol obtained from OPC Polymers), 0.25 gram of DESMOPHEN® 1652A (a saturated polyester obtained from Bayer), 0.6 gram of CYMEL® 1130 (a methylated, butylated melamine-formaldehyde crosslinking agent obtained from Cytec Industries Inc.), 0.8 gram of 4,4'-(3,4-dimethylphenylazanediyl)bis(4,1-phenylene)dimethanol (DHM-TPA or dihydroxymethyl-triphenylamine), and 0.2 gram of 8 percent p-toluenesulfonic acid catalyst (predissolved in DOWANOL® PM, 1-methoxy-2-propanol obtained from the Dow Chemical Company) in 4.96 grams of DOWANOL® PM (1-methoxy-2-propanol obtained from the Dow Chemical Company) using a 0.125 mil Bird bar. The resultant overcoating was dried in a forced air oven for 2 minutes at 125° C. to yield a highly crosslinked, 3 micron thick overcoat, and which overcoat was substantially insoluble in methanol or ethanol.

Example III

A photoconductor was prepared by repeating the process of Example II except that an overcoating layer was formed from a solution of a composition formed by adding 1.25 grams of POLYCHEM® 7558-B-60 (an acrylated polyol obtained from OPC Polymers), 0.25 gram of DESMOPHEN® 1652A (a saturated polyester obtained from Bayer), 0.6 gram of CYMEL® 1130 (a methylated, butylated melamine-formaldehyde crosslinking agent obtained from Cytec Industries Inc.), 0.8 gram of 4,4'-(3,4-dimethylphenylazanediyl)bis(4,1-phenylene)dimethanol (DHM-TPA or dihydroxymethyl-triphenylamine), and 0.2 gram of 8 percent p-toluenesulfonic acid catalyst solution in 4.96 grams of a mixture of DOWANOL® PM (1-methoxy-2-propanol), 90 weight percent, and 2-propanol, 10 weight percent.

The resultant dried overcoat after evaporation of the solvent was believed to be comprised of, noting for example, that these percentages could change in that the overcoating components can be partially reacted, about 23 weight percent of POLYCHEM® 7558-B-60 (an acrylated polyol obtained from OPC Polymers), about 16 weight percent of PPG 2K (a polypropyleneglycol) had a composition of about 31 weight percent of POLYCHEM® 7558-B-60 (an acrylated polyol obtained from OPC Polymers), 10 weight percent of DESMOPHEN® 1652A (a saturated polyester obtained from Bayer), 25 weight percent of CYMEL® 1130 (a methylated, butylated melamine-formaldehyde crosslinking agent obtained from Cytec Industries Inc.), 33 weight percent of 4,4'-(3,4-dimethylphenylazanediyl)bis(4,1-phenylene) dimethanol (DHM-TPA or dihydroxymethyl-triphenylamine), and 1 weight percent of p-toluenesulfonic acid catalyst.

Electrical Property Testing

The above prepared photoconductors were tested in a scanner set to obtain photoinduced discharge cycles, sequenced at one charge-erase cycle, followed by one charge-expose-erase cycle, wherein the light intensity was incrementally increased with cycling to produce a series of photoinduced discharge characteristic (PIDC) curves from which the photosensitivity and surface potentials at various exposure intensities were measured. Additional electrical characteristics were obtained by a series of charge-erase cycles with incrementing surface potential to generate several voltage versus charge density curves. The scanner was equipped with a scorotron set to a constant voltage charging at various surface potentials. The photoconductors were tested at surface potentials of −700 volts with the exposure light intensity incrementally increased by means of a data acquisition system where the current to the light emitting diode was controlled to obtain different exposure levels. The exposure light source was a 780 nanometer light emitting diode. The xerographic simulation process was completed in an environmentally controlled light tight chamber at ambient conditions (40 percent relative humidity and 22° C.). The photoconductors were also operated for 10,000 imaging cycles electrically with charge-discharge-erase. Photoinduced discharge characteristic (PIDC) curves were generated at both cycle=0 and cycle=10,000. The results, which are summarized in Table 2, evidence that using a mixture of DOWANOL® and the above second alcohol solvent results in improved coating quality of the photoconductor layers, as determined by visual inspection which reveals more shiny coatings evidencing better coating quality, and hence potentially better scratch and crack resistance durability without undermining or adversely affecting the electrical performance of the photoconductor, and more specifically, the initial electrical characteristics of the photoconductor or the stability of these characteristics during long term repetitive imaging.

TABLE 2

| | V (2.6 ergs/cm$^2$) (V) | | |
| --- | --- | --- | --- |
| | Cycle = 0 | Cycle = 10,000 | Coating Quality |
| COMPARATIVE EXAMPLE 2 | 90.2 | 116.3 | Poor (due to haze) |
| EXAMPLE II | 90.1 | 115.6 | Good |

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. A photoconductor consisting essentially of and in sequence a substrate, a photogenerating layer, and at least one charge transport layer comprised of at least one charge transport component, and an overcoat layer in contact with and contiguous to the top charge transport layer wherein said overcoat layer is comprised of a mixture of a charge transport component, a crosslinking component, and a hydroxyl containing polymer, and wherein said coating is formed by applying in the presence of an organic acid catalyst a composition comprising a mixture of an alkyl alcohol, a glycol monoether, a crosslinking component, a charge transport component, and at least one of (i) a polyester, and (ii) an acrylated polyol.

2. A photoconductor in accordance with claim 1 wherein said overcoating components are heated, and which coating is crosslinked, and wherein said alcohol is propanol and said glycol monoether is a 1-propoxy-2-propanol, 1-methoxy-2-butanol, 1-phenoxy-2-propanol, di(propylene glycol), butyl ether di(propylene glycol) methyl ether or diethylene glycol butyl ether.

3. A photoconductor in accordance with claim 2 wherein said heating is at a temperature of from about 100° C. to about 180° C.

4. A photoconductor in accordance with claim 2 wherein said charge transport component is selected from the group consisting of at least one of N,N'-bis(4-butylphenyl)-N,N'-di-p-tolyl-[p-terphenyl]-4,4'-diamine, N,N'-bis(4-butylphenyl)-N,N'-di-m-tolyl-[p-terphenyl]-4,4'-diamine, N,N'-bis(4-butylphenyl)-N,N'-di-o-tolyl-[p-terphenyl]-4,4'-diamine, N,N'-bis(4-butylphenyl)-N,N'-bis-(4-isopropylphenyl)-[p-terphenyl]-4,4'-diamine, N,N'-bis(4-butylphenyl)-N,N'-bis-(2-ethyl-6-methylphenyl)-[p-terphenyl]-4,4'-diamine, N,N'-bis(4-butylphenyl)-N,N'-bis-(2,5-dimethylphenyl)-[p-terphenyl]-4,4'-diamine, and N,N'-diphenyl-N,N'-bis(3-chlorophenyl)-[p-terphenyl]-4,4'-diamine, and which charge transport layer further includes an antioxidant.

5. A photoconductor in accordance with claim 1 wherein said coating is comprised of a mixture of
   (i) 2-propanol;
   (ii) 1-methoxy-2-propanol;
   (iii) said crosslinking component is represented by

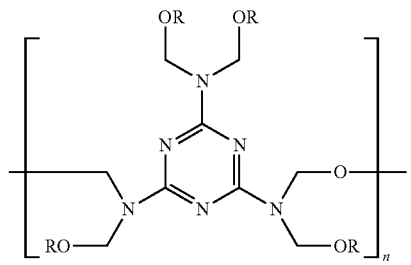

wherein R is selected from the group consisting of hydrogen, alkyl of methyl, ethyl, propyl, butyl, and mixtures thereof; and n represents the number of repeating units of from 1 to about 100;

(iv) a charge transport component selected from the group consisting of (A) and (B)

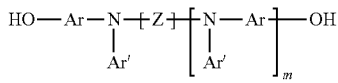 (A)

wherein m is zero or 1; Z is selected from the group consisting of at least one of

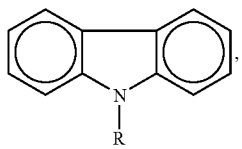

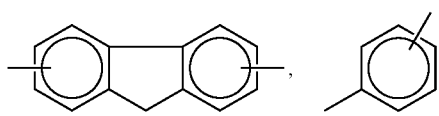

and

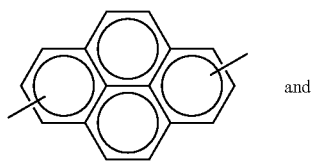

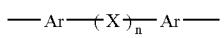

wherein n is 0 or 1; Ar is selected from the group consisting of at least one of

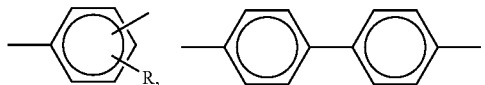

R is selected from the group consisting of at least one of alkyl of —CH$_3$, —C$_2$H$_5$, —C$_3$H$_7$, and C$_4$H$_9$, and Ar' is selected from the group consisting of at least one of

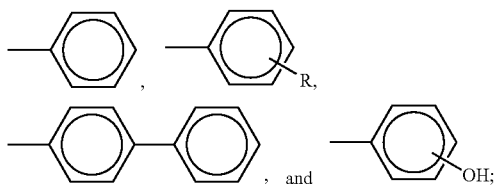

and X is selected from the group consisting of at least one of

—CH$_2$—, —C(CH$_3$)—, —O—, —S—,

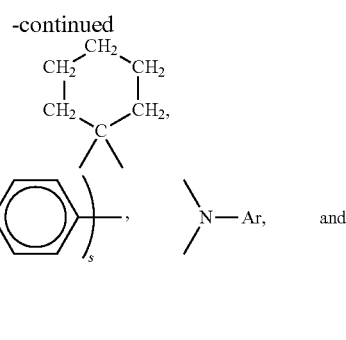

wherein S is zero, 1, or 2; and wherein said alkyl of said alkyl alcohol contains from 1 to about 12 carbon atoms, and which alcohol is present in an amount of from about 0.5 to about 15 weight percent; and Q-[L-OH]$_n$  (B)

wherein L represents a divalent linkage group having from 1 to about 10 carbons; n represents a number of from 1 to about 5, and Q is represented by the following general formula

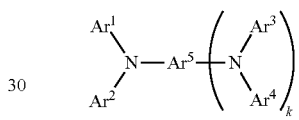

wherein Ar$^1$, Ar$^2$, Ar$^3$, Ar$^4$, and Ar$^5$ each independently represents a substituted or unsubstituted aryl group, or wherein Ar$^5$ independently represents a substituted or unsubstituted arylene group; and k represents 0 or 1; and wherein at least one of Ar$^1$, Ar$^2$, Ar$^3$ and Ar$^4$ is connected to the linkage group;

(v) an acrylated polyol represented by

[R$s$-CH2]$t$-[-CH2-R$a$-CH2]$p$-[-CO—R$b$-CO]$n$-[-CH2-R$c$-CH2]$p$-[-CO—R$d$-CO-]$q$, where R$_s$ represents CH$_2$CR$_1$CO$_2$—; where t is equal to 0 to 1 and represents the number of mole fraction acrylic groups on available sites; and where R$_a$ and R$_c$ independently represent at least one of a linear alkyl group, a linear alkoxy group, a branched alkyl group, and a branched alkoxy group; wherein each alkyl and alkoxy group contains from about 1 to about 20 carbon atoms; R$_b$ and R$_d$ independently represent at least one of an alkyl and alkoxy wherein said alkyl and said alkoxy each contain from about 1 to about 20 carbon atoms; and m, n, p, and q represent mole fractions of from 0 to 1, such that n+m+p+q is equal to 1; and (vi) a polypropylene glycol possessing a weight average molecular weight of from about 400 to about 5,000; and wherein (vii) said polypropylene glycol is present in an amount of from about 25 to about 50 weight percent of the total weight of said polypropylene glycol and said acrylated polyol; and (viii) wherein said charge transport component is present in an amount of from about 30 to about 45 weight percent of the total weight of said charge transport component, said crosslinking component, said polypropylene glycol, and said acrylated polyol.

6. A photoconductor in accordance with claim 1 wherein said coating is comprised of a mixture of
   (i) a propanol;
   (ii) a methoxy propanol;
   (iii) a crosslinking component of

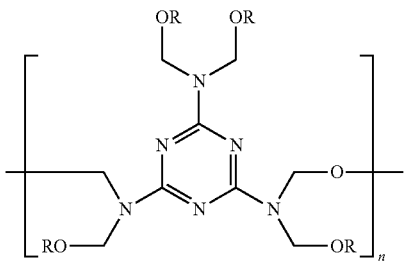

wherein R is selected from the group consisting of hydrogen, methyl, ethyl, propyl, butyl, and mixtures thereof, and n is the number of repeating units of from 1 to about 100;
   (iv) a charge transport component selected from the group consisting of (A) and (B)

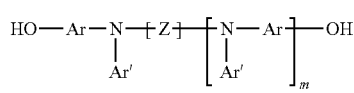       (A)

wherein m is zero or 1; Z is selected from the group consisting of at least one of

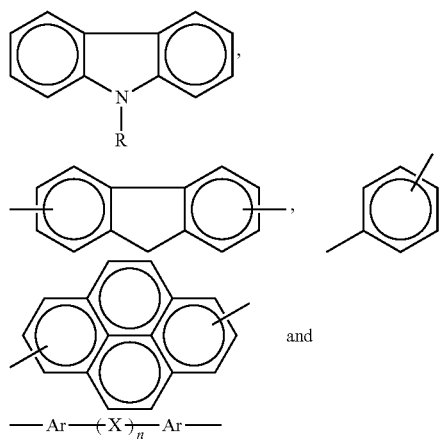

wherein n is 0 or 1; Ar is selected from the group consisting of at least one of

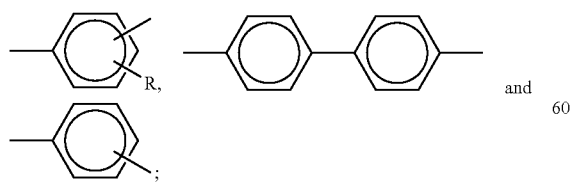

R is selected from the group consisting of at least one of —CH$_3$, —C$_2$H$_5$, —C$_3$H$_7$, and C$_4$H$_9$, and Ar' is selected from the group consisting of at least one of

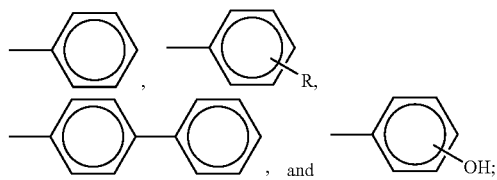

and X is selected from the group consisting of at least one of

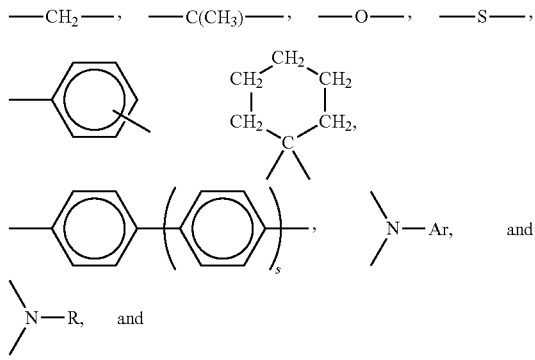

wherein S is zero, 1, or 2; and wherein said alkyl of said alkyl alcohol contains from 1 to about 12 carbon atoms, and which alcohol is present in an amount of from about 0.5 to about 12 weight percent; and

       (B)

wherein L represents a divalent linkage group with from 2 to about 12 carbon atoms; n represents a number of from 1 to about 5; and Q is represented by the following general formula

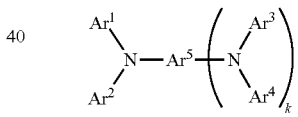

wherein Ar$^1$, Ar$^2$, Ar$^3$, Ar$^4$, and Ar$^5$ each independently represents a substituted or unsubstituted aryl group, or wherein Ar$^5$ independently represents a substituted or unsubstituted arylene group; and k represents 0 or 1, wherein at least one of Ar$^1$, Ar$^2$, Ar$^3$, and Ar$^4$ is connected to the linkage group;
   (v) a hydroxyl-containing polyester; and wherein said hydroxyl containing polyester having a hydroxyl number of from about 10 to about 1,000, and a saturated polyester; and wherein
   (vi) said propanol is present in an amount of from about 5 to about 55 weight percent of the total weight of said propanol and said methoxy propanol;
   (vii) said saturated polyester is present in an amount of from about 25 to about 50 weight percent of the total weight of said saturated polyester and said hydroxyl-containing polyester; and
   (viii) said charge transport component is present in an amount of from about 30 to about 45 weight percent of the total weight of said charge transport component, said crosslinking component, said saturated polyester and said hydroxyl-containing polyester.

7. A photoconductor in accordance with claim 2 wherein said coating composition is comprised of a mixture of (i) 2-propanol;
(ii) 1-methoxy-2-propanol;
(iii) a crosslinking component represented by

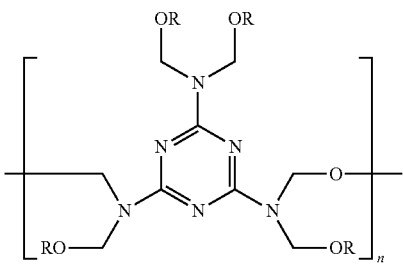

wherein R is selected from the group consisting of hydrogen, alkyl, and mixtures thereof; and n represents the number of repeating units of from 1 to about 100;

(iv) a charge transport component of (A) or (B)

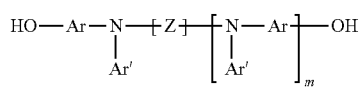

(A)

wherein m is zero or 1; Z is selected from the group consisting of at least one of

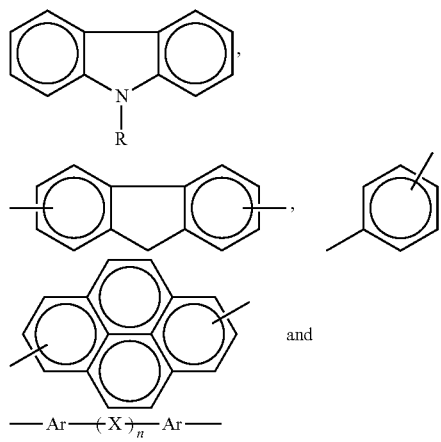

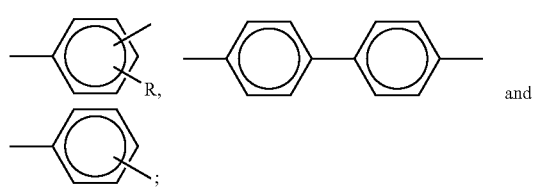

wherein n is 0 or 1; Ar is selected from the group consisting of at least one of R is selected from the group consisting of at least one of —$CH_3$, —$C_2H_5$, —$C_3H_7$, and $C_4H_9$, and Ar' is selected from the group consisting of at least one of

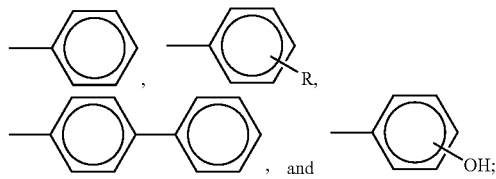

and X is selected from the group consisting of at least one of

—$CH_2$—, —$C(CH_3)$—, —O—, —S—,

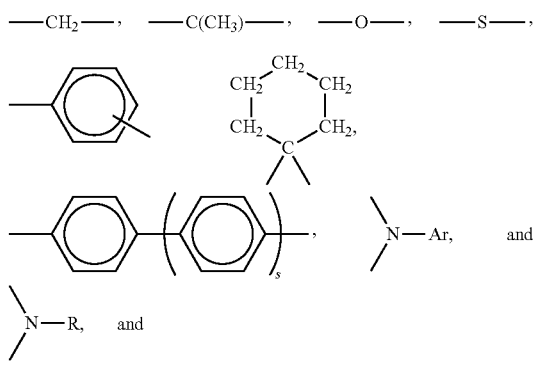

wherein S is zero, 1, or 2; and wherein said alkyl of said alkyl alcohol contains from 1 to about 12 carbon atoms, and which alcohol is present in an amount of from about 0.5 to about 12 weight percent; or

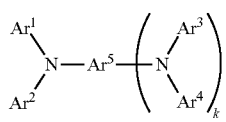

(B)

wherein L represents a divalent linkage group having from 1 to about 10 carbons; n represents a number of from 1 to about 5; and Q is represented by the following general formula

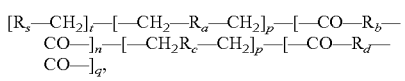

wherein $Ar^1$, $Ar^2$, $Ar^3$, $Ar^4$, and $Ar^5$ each independently represents a substituted or unsubstituted aryl group, or $Ar^5$ independently represents a substituted or unsubstituted arylene group; and k represents 0 or 1, wherein at least one of $Ar^1$, $Ar^2$, $Ar^3$, and $Ar^4$ is connected to the linkage group;

(v) an acrylated polyol represented by $[R_s—CH_2]_t—[—CH_2—R_a—CH_2]_p—[—CO—R_b—CO—]_n—[—CH_2R_c—CH_2]_p—[—CO—R_d—CO—]_q$, where $R_s$ represents $CH_2CR_1CO_2$—; where t is equal to 0 to 1 and represents the mole fraction acrylic groups on available sites; and where $R_a$ and $R_c$ independently represent at least one of a linear alkyl group, a linear alkoxy group, a branched alkyl group, and a branched alkoxy group, wherein each alkyl and alkoxy group contain from about 1 to about 20 carbon atoms; $R_b$ and $R_d$ independently represent at least one of an alkyl and alkoxy wherein said alkyl and said alkoxy each contain from about 1 to about 20 carbon atoms; and m, n, p, and q represent mole fractions of from 0 to 1, such that n+m+p+q=1; and (vi) a saturated polyester; and wherein
(vii) said 2-propanol is present in an amount of from about 10 to about 75 weight percent of the total weight of said 2-propanol, and of said 1-methoxy-2-propanol;
(viii) said saturated polyester is present in an amount of from about 25 to about 50 weight percent of the total weight of said saturated polyester and said acrylated polyol; and
(ix) wherein said charge transport component is present in an amount of from about 30 to about 45 weight percent of the total weight of said charge transport component, said crosslinking component, said saturated polyester, and said acrylated polyol.

8. A photoconductor in accordance with claim 1 wherein said charge transport layer comprises aryl amine molecules, and which aryl amines are comprised of at least one of

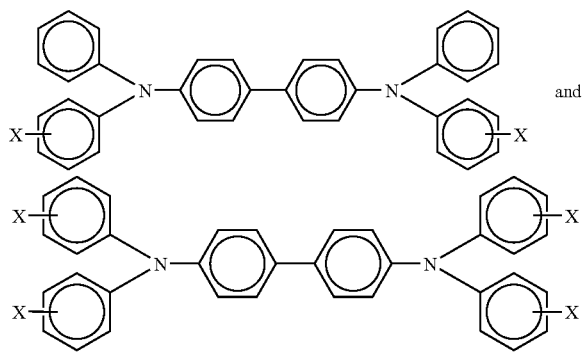

wherein X is selected from the group consisting of at least one of alkyl, alkoxy, aryl, and halogen, and wherein said alcohol is propanol and said glycol monoether is a 1-propoxy-2-propanol, 1-methoxy-2-butanol, 1-phenoxy-2-propanol, di(propylene glycol), butyl ether di(propylene glycol) methyl ether or diethylene glycol butyl ether and said at least one of (i) a polyester, and (ii) an acrylated polyol is a acrylated polyol.

9. A photoconductor in accordance with claim 1 wherein said charge transport component is N,N'-diphenyl-N,N-bis(3-methylphenyl)-1,1'-biphenyl-4,4'-diamine.

10. A photoconductor in accordance with claim 1 wherein said transport layer comprises at least one of

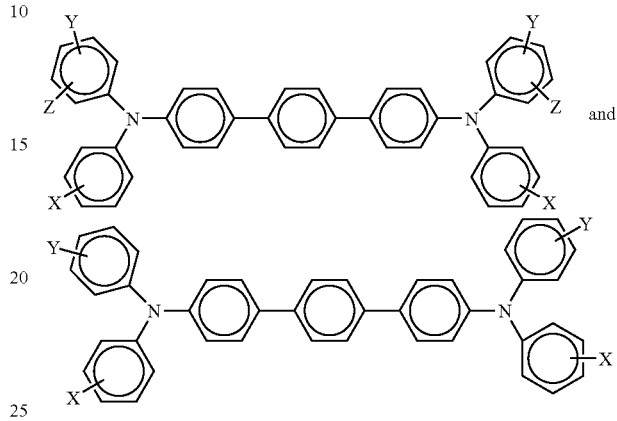

wherein each X, Y and Z is independently selected from the group consisting of at least one of alkyl, alkoxy, aryl, and halogen, and mixtures thereof, and wherein said overcoat layer has a thickness from about 1 micron to about 5 microns halogen, wherein said alcohol is propanol and said glycol monoether is a 1-propoxy-2-propanol, 1-methoxy-2-butanol, 1-phenoxy-2-propanol, di(propylene glycol), butyl ether di(propylene glycol) methyl ether or diethylene glycol butyl ether and said at least one of (i) a polyester, and (ii) an acrylated polyol is an acrylated polyol and said charge transport layer further includes an antioxidant.

* * * * *